(12) United States Patent
Morita et al.

(10) Patent No.: US 12,106,731 B2
(45) Date of Patent: Oct. 1, 2024

(54) DRIVER HAVING VARIABLE CAPACITANCE CAPACITOR, ELECTRO-OPTICAL DEVICE AND ELECTRONIC APPARATUS

(71) Applicant: SEIKO EPSON CORPORATION, Tokyo (JP)

(72) Inventors: Akira Morita, Chino (JP); Ryota Bansho, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 18/333,499

(22) Filed: Jun. 12, 2023

(65) Prior Publication Data

US 2023/0410764 A1 Dec. 21, 2023

(30) Foreign Application Priority Data

Jun. 15, 2022 (JP) ................ 2022-096322

(51) Int. Cl.
*G09G 3/30* (2006.01)
*G02F 1/133* (2006.01)
*G09G 3/20* (2006.01)
*G09G 3/36* (2006.01)

(52) U.S. Cl.
CPC ....... *G09G 3/3696* (2013.01); *G02F 1/13306* (2013.01); *G09G 3/2096* (2013.01); *G09G 3/3614* (2013.01); *G02F 2202/104* (2013.01); *G09G 2300/0819* (2013.01); *G09G 2310/0289* (2013.01); *G09G 2310/0291* (2013.01); *G09G 2310/08* (2013.01); *G09G 2330/021* (2013.01)

(58) Field of Classification Search
CPC ............... G09G 3/2096; G09G 3/2614; G09G 3/2696; G09G 2300/0819; G09G 2310/0291; G02F 1/13306; G02F 2202/104
See application file for complete search history.

(56) References Cited

U.S. PATENT DOCUMENTS

| | | |
|---|---|---|
| 2010/0053145 A1 | 3/2010 | Morita |
| 2010/0225511 A1 | 9/2010 | Nishimura |
| 2011/0148516 A1* | 6/2011 | Tanaka .................... H03F 3/005 327/564 |

(Continued)

FOREIGN PATENT DOCUMENTS

JP 2016080807 5/2016

*Primary Examiner* — Sanghyuk Park
(74) *Attorney, Agent, or Firm* — JCIPRNET

(57) ABSTRACT

A driver includes a first driving circuit and a second driving circuit. The second driving circuit includes a computation amplifier, an output capacitor, a first feedback capacitor, and a second feedback capacitor. One end of the output capacitor is coupled to an output node of the computation amplifier, and the other end is coupled to the signal supply line. One end of the first feedback capacitor is coupled to an inverting input node of the computation amplifier, and the other end is coupled to the signal supply line. One end of the second feedback capacitor is coupled to the inverting input node of the computation amplifier, and the other end is coupled to a predetermined potential node. At least one of the first feedback capacitor and the second feedback capacitor is a capacitor with a variable capacitance value.

17 Claims, 22 Drawing Sheets

(56) References Cited

U.S. PATENT DOCUMENTS

2014/0152642 A1\* 6/2014 Kim ................ H03K 17/30
                                                  327/317
2016/0111035 A1   4/2016 Morita
2018/0308428 A1\* 10/2018 Chen ................ H10K 59/131

\* cited by examiner

DRIVER HAVING VARIABLE CAPACITANCE CAPACITOR, ELECTRO-OPTICAL DEVICE AND ELECTRONIC APPARATUS

The present application is based on, and claims priority from JP Application Serial Number 2022-096322, filed Jun. 15, 2022, the disclosure of which is hereby incorporated by reference herein in its entirety.

BACKGROUND

1. Technical Field

The present disclosure relates to a driver, an electrooptical device, an electronic apparatus and the like.

2. Related Art

JP-A-2016-80807 discloses a driver that includes a capacitance driving circuit and an amplifier circuit, and drives an electrooptic panel. After the start of capacitance driving for driving the electrooptic panel by the circuit capacitance driving circuit, the amplifier performs voltage driving for outputting the data voltage corresponding to the gradation data to the data voltage output terminal. In this manner, the voltage drop of the data line after the source line switch of the electrooptic panel turns on from off is compensated by the amplifier circuit, and thus the reduction in accuracy of the data voltage in the capacitance driving is suppressed.

In the driving of a liquid crystal panel, the range of the drive voltage differs depending on the color of light incident on the liquid crystal panel or the liquid crystal material used for the liquid crystal panel. In JP-A-2016-80807, a voltage follower circuit is used as an amplifier circuit and the gain of the amplifier circuit is fixed, and it is therefore difficult to change the range of the drive voltage. For example, in JP-A-2016-80807, it is necessary to change the range of the drive voltage by changing the range of the drive voltage by changing the gradation range, i.e., the number of gradations, or recreate the driving circuit by changing the power source voltage, the gain or the like without changing the number of gradations.

SUMMARY

An aspect of the present disclosure relates to a driver including a first driving circuit configured to supply a data signal to a signal supply line of an electrooptic panel based on gradation data, and a second driving circuit including a computation amplifier, an output capacitor, a first feedback capacitor, and a second feedback capacitor, and electrically coupled to the signal supply line, the output capacitor including one end electrically coupled to an output node of the computation amplifier and the other end electrically coupled to the signal supply line, the first feedback capacitor including one end electrically coupled to an inverting input node of the computation amplifier and the other end electrically coupled to the signal supply line, the second feedback capacitor including one end electrically coupled to the inverting input node of the computation amplifier and the other end electrically coupled to a predetermined potential node. At least one of the first feedback capacitor and the second feedback capacitor is a capacitor with a variable capacitance value.

In addition, another aspect of the present disclosure relates to an electrooptical device including the above-mentioned driver and the electrooptic panel.

In addition, still another aspect of the present disclosure relates to an electronic apparatus including the above-mentioned driver.

DESCRIPTION OF EXEMPLARY EMBODIMENTS

A preferred embodiment of the present disclosure is elaborated below. The embodiment described below does not unduly limit the contents of the claims, and not all of the configurations described in the embodiment are essential configuration requirements.

1. Electrooptical Device

Figure 1:
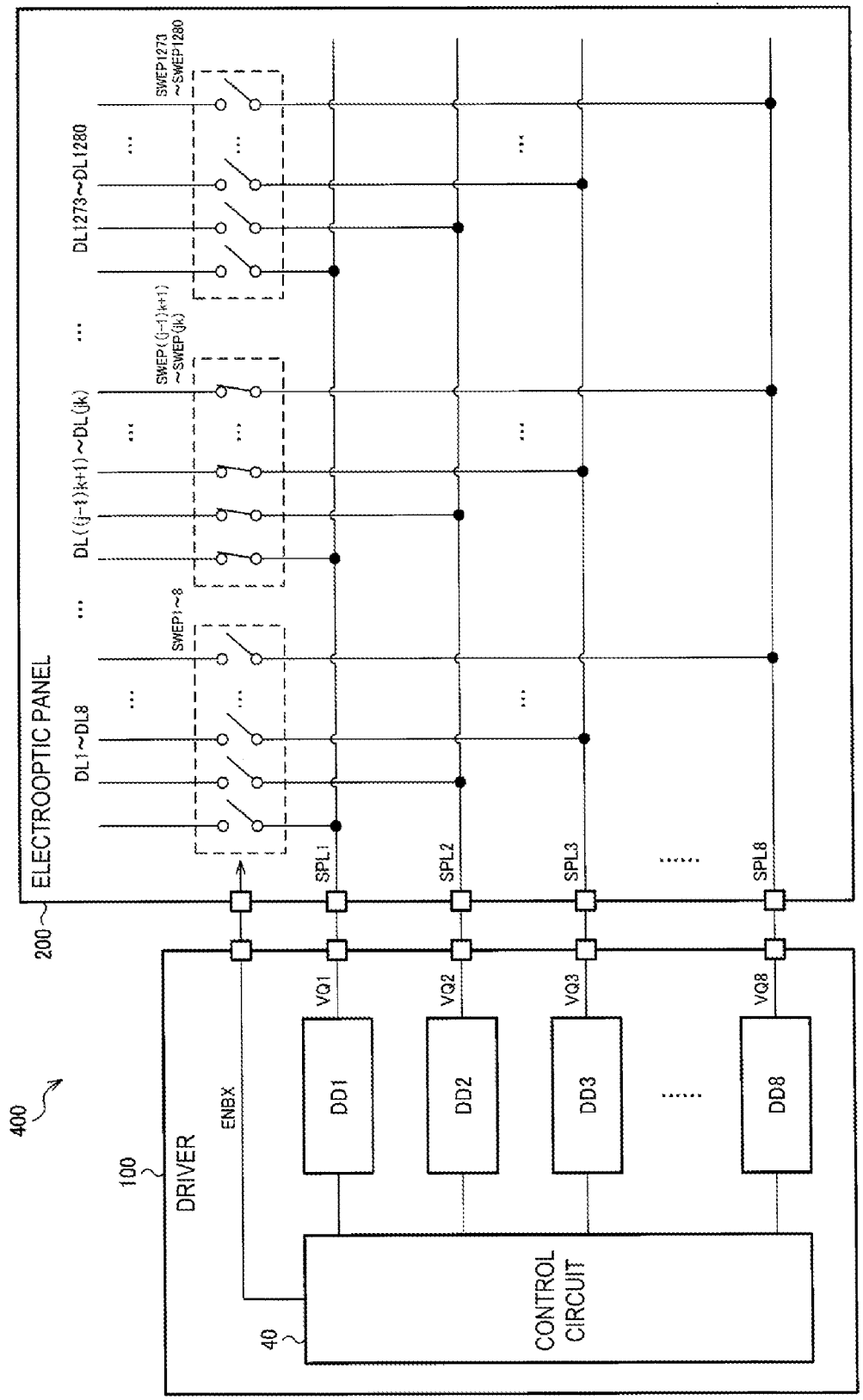
FIG. 1 illustrates an exemplary configuration of an electrooptical device.

FIG. 1 illustrates a configuration example of an electrooptical device. An electrooptical device 400 includes a driver 100 and an electrooptic panel 200. While the electrooptical device 400 of a phase expansion driving type is described as an example in the following description, this is not limitative, and the electrooptical device 400 may be of a demultiplexing driving type, for example.

The driver 100 drives the electrooptic panel 200 by outputting a data signal to a signal supply line of the electrooptic panel 200. Note that the voltage written to one pixel at one time is referred to as data voltage. Further, when a plurality of pixels is driven in a time-series manner, the data voltage for each pixel is output as a time-series signal to the signal supply line, and this signal to the signal supply line is referred to as data signal.

The scan line driving circuit that drives the scan line of the electrooptic panel 200 may be included in the driver 100, or may be provided outside the driver 100. The driver 100 is an integrated circuit device in which a plurality of circuit elements is integrated on a semiconductor substrate, for example. The driver 100 includes a control circuit 40, and first to kth data line driving circuits DD1 to DDk. The k is an integer of 2 or more. Note that an exemplary case where k=8 is described below.

The control circuit 40 outputs corresponding gradation data to each data line driving circuit of the data line driving circuits DD1 to DD8. In addition, the control circuit 40 outputs a control signal ENBX for controlling the data line switch to the electrooptic panel 200.

The data line driving circuits DD1 to DD8 convert gradation data into a data voltage, and output the data voltage as output voltages VQ1 to VQ8 to signal supply lines SPL1 to SPL8 of the electrooptic panel 200. The output voltages VQ1 to VQ8 change in accordance with time-series gradation data, and the signals of the changing output voltages VQ1 to VQ8 correspond to the above-described data signal.

The electrooptic panel 200 includes the first to eighth signal supply lines SPL1 to SPL8, first to 1280th data line switches SWEP1 to SWEP1280, and first to 1280th data lines DL1 to DL1280. The number of data lines may be k×t. The t is an integer of 2 or more. Here, WXGA is taken as an example, and t=160 is set.

One end of each of data line switches SWEP ((j−1)×k+1) to SWEP (j×k) of the data line switches SWEP1 to SWEP1280 is coupled to the signal supply lines SPL1 to SPL8. The j is an integer of 160 or smaller. For example, in the case of j=1, they are the data line switches SWEP1 to SWEP8.

Each of the data line switches SWEP1 to SWEP1280 is composed of a TFT or the like, and is controlled based on the control signal ENBX, for example. TFT is an abbreviation of Thin Film Transistor. For example, the electrooptic panel 200 includes a switch control circuit not illustrated in the drawing, and the switch control circuit controls the data line switches SWEP1 to SWEP1280 on or off on the basis of the control signal ENBX.

The data line driving circuits DD1 to DD8 perform the driving 160 times in the horizontal scanning period, and, in the j-th driving, data line switches SWEP ((j−1)×k+1) to SWEP (j×k) are on, and the other data line switches are off.

In this manner, in the j-th driving, the data lines D L ((j−1)×k+1) to DL (j×k) are driven. Regarding the data line driving circuit DD1, in the horizontal scanning period, the data line switches SWEP1, SWEP2, . . . , SWEP1273 are sequentially turned on, and the data line driving circuit DD1 sequentially drives the data lines DL1, DL2, . . . , DL1273.

2. First Embodiment

Figure 2:
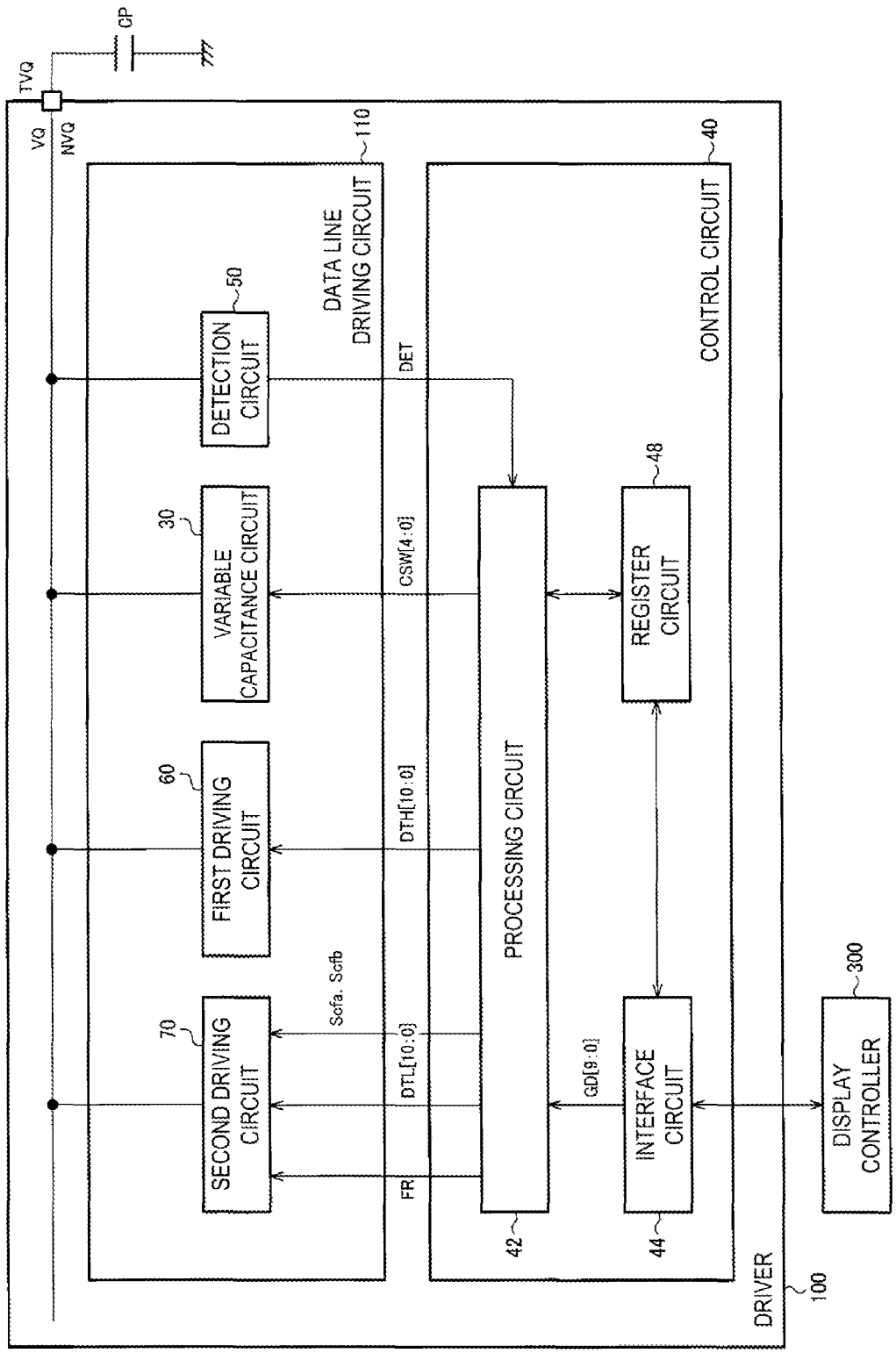
FIG. 2 illustrates a first specific configuration example of a driver.

FIG. 2 illustrates a first specific configuration example of a driver. The driver 100 includes a data line driving circuit 110 and the control circuit 40. The data line driving circuit 110 corresponds to any one of the data line driving circuits DD1 to DD8 of FIG. 1.

The data line driving circuit 110 includes a first driving circuit 60, a second driving circuit 70, a variable capacitance circuit 30, and a detection circuit 50. The control circuit 40 includes a processing circuit 42, an interface circuit 44, and a register circuit 48.

The interface circuit 44 performs an interface process between a display controller 300 that controls the driver 100 and the driver 100. The interface circuit 44 outputs, to the processing circuit 42, gradation data GD [9:0] received from the display controller 300. Note that the number of bits of the received gradation data may be arbitrary. The interface circuit 44 is an image interface circuit of an LVDS type, a parallel RGB type, a display port type or the like, for example. LVDS is an abbreviation of Low Voltage Differential Signaling.

In an initialization process at the time of power on of the driver 100 and the like, the processing circuit 42 determines setting data CSW [4:0] of the capacitance value of the variable capacitance circuit 30, and stores the setting data CSW [4:0] in the register circuit 48. In a normal operation for driving the electrooptic panel 200, the processing circuit 42 sets the capacitance value of the variable capacitance circuit 30 with the setting data CSW [4:0] read from the register circuit 48. In addition, on the basis of gradation data GD [9:0], the processing circuit 42 outputs gradation data DTH [10:0] to the first driving circuit 60, and outputs gradation data DTL [10:0] to the second driving circuit 70. In addition, the processing circuit 42 outputs a polarity inversion signal FR to the second driving circuit 70. Note that depending on the configuration of the second driving circuit 70, the input of the polarity inversion signal FR to the second driving circuit 70 may be omitted.

An output node NVQ is a node coupled to a data voltage output terminal TVQ, and the voltage of the output node NVQ is an output voltage VQ. The load capacitance of the data voltage output terminal TVQ is an electrooptic panel side capacitance CP.

The first driving circuit 60 supplies the charge corresponding to the gradation data DTH [10:0] to the output node NVQ through charge redistribution using the capacitor. When the charge is distributed to the variable capacitance circuit 30 and the electrooptic panel side capacitance CP, the output voltage VQ becomes a data voltage corresponding to the gradation data DTH [10:0]. The first driving circuit 60 is composed of a high-breakdown voltage process circuit element that can drive the electrooptic panel 200. In an exemplary case where the electrooptic panel 200 is a liquid crystal panel of a high-temperature polysilicon type, the power source voltage of the first driving circuit 60 is about 15 V to 20 V, and the first driving circuit 60 is composed of a circuit element with a breakdown voltage higher than that of the power source voltage.

When there is an error in the charge output by the first driving circuit 60, or the charge storage of the output node NVQ is slightly not viable, an error occurs between the output voltage VQ due to the charge output by the first driving circuit 60 and the target voltage corresponding to the gradation data DTH [10:0]. The second driving circuit 70 corrects the output voltage VQ to the target voltage through a feedback-control using a computation amplifier. In this case, since the error between the output voltage VQ and the target voltage is small, the amount of the charge output by the second driving circuit 70 can be small. By utilizing this, the computation amplifier is configured with a low-breakdown voltage process circuit element, while making DC-cut between the computation amplifier and the output node NVQ with a capacitor. As an example, the breakdown voltage of the low-breakdown voltage process is about ⅓ to ⅒ of the breakdown voltage of the high-breakdown voltage process. The second driving circuit 70 operates with a power source voltage lower than the breakdown voltage of the low-breakdown voltage process.

A capacitance value determination method of the variable capacitance circuit 30 and configuration examples of the variable capacitance circuit 30 and the detection circuit 50 are described below.

The detection circuit 50 compares a given detection voltage and the output voltage VQ, and outputs the result as a detection signal DET. The detection circuit 50 is a comparator, for example.

The processing circuit 42 outputs the gradation data DTH [10:0] corresponding to a given data voltage to a capacitor driving circuit 20. In this case, the above-mentioned given detection voltage is set to the same voltage as the given data voltage, which is an expected value of the output voltage VQ. The processing circuit 42 sequentially changes the capacitance value of the variable capacitance circuit 30 by sequentially changing the value of the setting data CSW [4:0]. The processing circuit 42 determines the capacitance value of the variable capacitance circuit 30 on the basis of the detection signal DET at each capacitance value. Specifically, the processing circuit 42 determines the capacitance value with which the output voltage VQ is set to the given detection voltage on the basis of the detection signal DET, and stores the setting data CSW [4:0] of the capacitance value in the register circuit 48.

The variable capacitance circuit 30 includes first to fifth adjusting capacitors and first to fifth adjusting switches. One end of the first adjusting switch is coupled to the output node NVQ, and the other end is coupled to one end of the first adjusting capacitor. The other end of the first adjusting capacitor is coupled to the ground node. The same applies to the second to fifth adjusting capacitors and the second to fifth adjusting switches. The capacitance values of the first to fifth adjusting capacitors are weighted in a binary manner. The first adjusting switch is controlled on or off by the CSW [0]. Likewise, the second to fifth adjusting switches are controlled on or off by the CSW [1] to CSW [4].

The first driving circuit 60, the second driving circuit 70, the variable capacitance circuit 30 and the detection circuit 50 are described in detail below.

Figure 3:
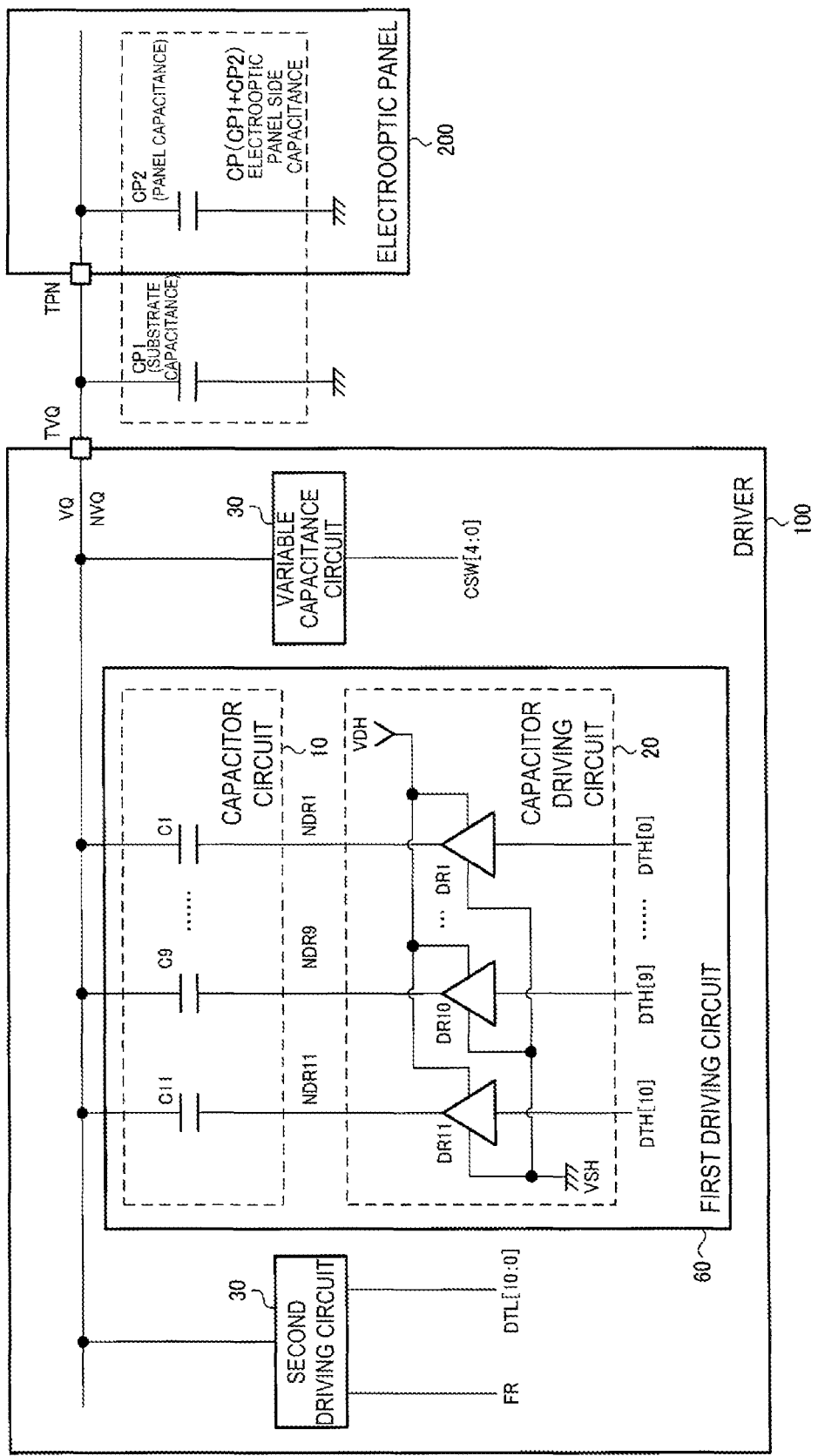
FIG. 3 illustrates a first specific configuration example of a first driving circuit.

FIG. 3 illustrates a first specific configuration example of a first driving circuit. Note that in the following description, as the reference symbol representing the capacitance value of the capacitor, the same reference symbol as the reference symbol of that capacitor is used. For example, the capacitance value of a capacitor C1 is represented by C1.

A capacitor circuit 10 includes first to n-th capacitors C1 to Cn. The capacitor driving circuit 20 includes first to n-th driving circuits DR1 to DRn. While an example of n=11 is described below, it suffices that n is an integer of 2 or more. It suffices that n is set to the same number as the number of bits of the gradation data DTH [10:0].

One end of the capacitor Ci is coupled to the output node NVQ, and the other end is coupled to a capacitor drive node NDRi. The i is an integer of 1 or more and n=11 or smaller. The capacitors C1 to C10 are capacitance values weighted in a binary manner. More specifically, the capacitance value of the capacitor Ci is $2^{(i-1)} \times C1$.

The processing circuit 42 outputs the i-th bit DTH [i−1] of the gradation data DTH [10:0] to the input node of the driving circuit DRi. The driving circuit DRi outputs the first voltage level to the capacitor drive node NDRi when the bit DTH [i−1] is at the first logic level, and outputs the second voltage level to the capacitor drive node NDRi when the bit DTH [i−1] is at the second logic level. For example, the first logic level is "0", the second logic level is "1", the first voltage level is the low-potential side power source voltage VSH, and the second voltage level is the high-potential side power source voltage VDH. The driving circuit DRi is composed of a high-breakdown voltage process transistor, and operates with the power source voltages VDH and VSH. The driving circuit DRi is composed of a level shifter that level-shifts the input logic level to the output voltage level of the driving circuit DRi, and a buffer circuit that buffers the output of the level shifter.

When the driving circuits DR1 to DR11 drive the capacitors C1 to C11, charge redistribution occurs between the capacitors C1 to C11, the variable capacitance circuit 30, and the electrooptic panel side capacitance CP. As a result, the data voltage is output to the output node NVQ.

The electrooptic panel side capacitance CP is the sum of the capacitances seen from the data voltage output terminal TVQ. For example, the electrooptic panel side capacitance CP is obtained by adding up a substrate capacitance CP1, which is the parasitic capacitance of the printed board, and a panel capacitance CP2, which is the parasitic capacitance in the electrooptic panel 200. The printed board is a substrate on which the driver 100 is mounted and which is coupled to the electrooptic panel 200.

It is assumed that the sum of the capacitance values of the capacitors C1 to C11 is Ctot=C1+C2+ . . . +C11, and the capacitance value of the variable capacitance circuit 30 is CF. As an example, the CF is set such that Ctot/(CF+CP)=2 holds. In this case, at the maximum gradation value 2047 of the DTH [10:0], VQ=15 V×{Ctot/(Ctot+CF+CP)}+2.5 V=10 V+2.5 V=12.5 V is obtained. At the minimum gradation value 0 of the DTH [10:0], VQ=0 V×{Ctot/(Ctot+CF+CP)}+2.5 V=0 V+2.5 V=2.5 V is obtained. The specific relationship between the gradation value and the voltage will be described later with reference to FIG. 7.

Figure 4:
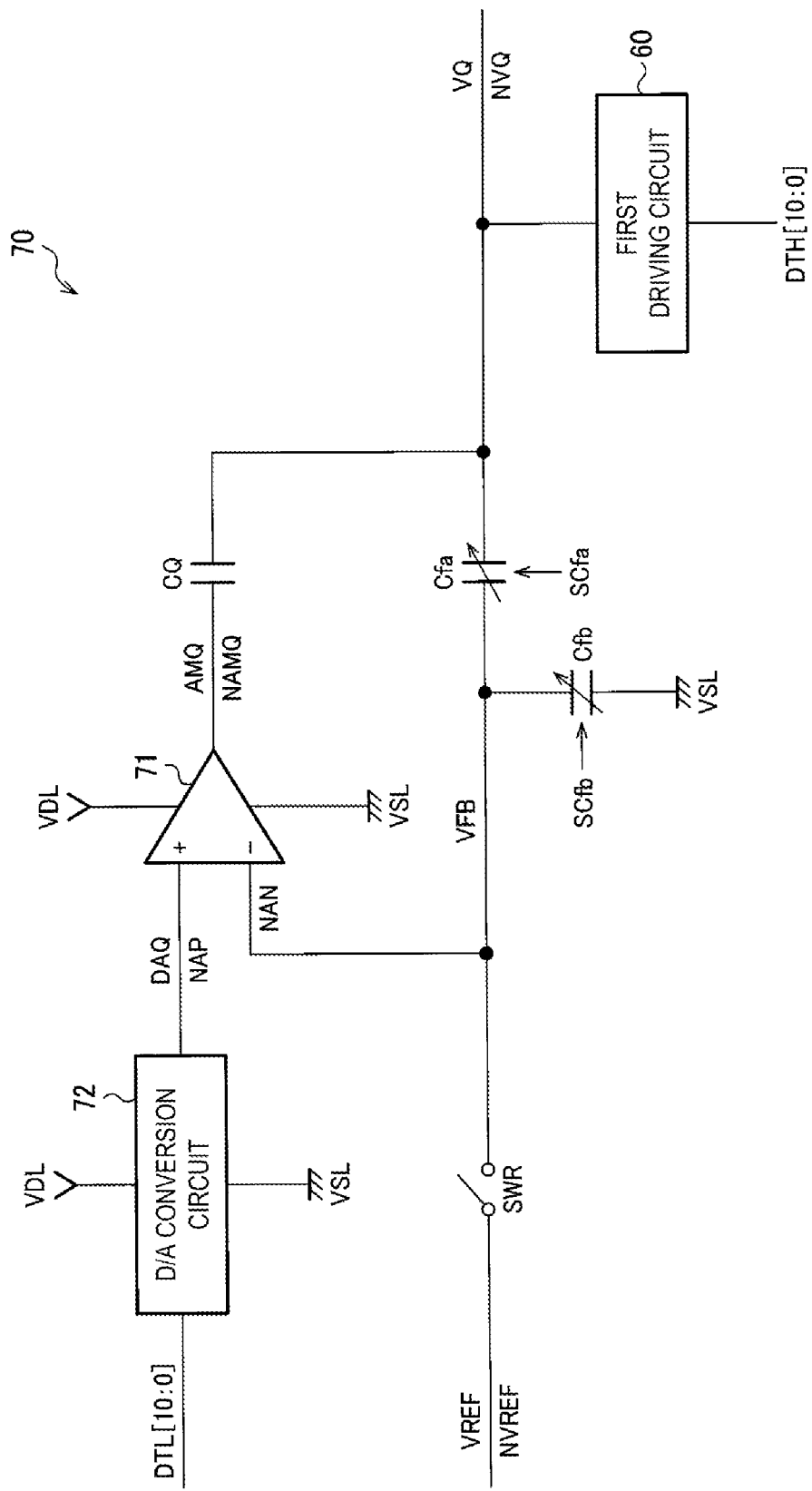
FIG. 4 illustrates a first specific configuration example of a second driving circuit.

FIG. 4 illustrates a first specific configuration example of the second driving circuit. The second driving circuit 70 includes a computation amplifier 71, a D/A conversion circuit 72, an output capacitor CQ, a first feedback capacitor Cfa, a second feedback capacitor Cfb, and an initialization switch SWR.

The D/A conversion circuit 72 D/A-converts the gradation data DTL [10:0] into a D/A conversion voltage DAQ, and the outputs the D/A conversion voltage DAQ to a non-inverting input node NAP of the computation amplifier 71. The relationship between the gradation data DTL [10:0] and the D/A conversion voltage DAQ will be described later with reference to FIG. 8. The D/A conversion circuit 72 includes a ladder resistor that divides the power source voltages VDL and VSL into a plurality of voltages, and a switch circuit that selects the voltage corresponding to the gradation data DTL [10:0] from among the plurality of voltages, for example.

The computation amplifier 71 is composed of a low-breakdown voltage process transistor, and operates with the power source voltages VDL and VSL.

One end of the output capacitor CQ is coupled to an output node NAMQ of the computation amplifier 71, and the other end is coupled to the output node NVQ of the data line driving circuit 110. One end of the first feedback capacitor Cfa is coupled to an inverting input node NAN of the computation amplifier 71, and the other end is coupled to the output node NVQ of the data line driving circuit 110. One end of the second feedback capacitor Cfb is coupled to the inverting input node NAN of the computation amplifier 71, and the other end is coupled to the node of the low-potential side power source voltage VSL. Note that it suffices that the other end of the second feedback capacitor Cfb is coupled to a predetermined potential node to which a constant potential is supplied.

The first feedback capacitor Cfa is a variable capacitance capacitor with a variable capacitance value. The second feedback capacitor Cfb is a variable capacitance capacitor with a variable capacitance value. The capacitance value of the first feedback capacitor Cfa is set by setting data SCfa from the processing circuit 42, and the capacitance value of the second feedback capacitor Cfb is set by setting data SCfb from the processing circuit 42. For example, the display controller 300 writes the setting data SCfa and SCfb in the register circuit 48 through the interface circuit 44, and the processing circuit 42 outputs the setting data SCfa and SCfb stored in the register circuit 48 to the second driving circuit 70. Note that it is possible that one of the first feedback capacitor Cfa and the second feedback capacitor Cfb is a variable capacitance capacitor and the other is a fixed capacitance capacitor.

One end of the initialization switch SWR is coupled to the inverting input node NAN of the computation amplifier 71, and the other end is coupled to a node NVREF to which a reference voltage VREF is supplied. The reference voltage VREF is a voltage higher than the VSL and lower than the VDL. It is assumed here that VREF=VCL=0.9 V holds. The reference voltage VREF is supplied to the node NVREF from the voltage generation circuit not illustrated in the drawing included in the driver 100, for example. The initialization switch SWR is an analog switch, and is an N-type transistor, a P-type transistor or a transfer gate combining them, for example.

The range of the output voltage VQ is set to 10 V, and the voltage range of the D/A conversion voltage DAQ is set to 1 V. In this case, since it suffices that voltage range is divided in 9:1 by the first feedback capacitor Cfa and the second feedback capacitor Cfb, the capacitance values of the first feedback capacitor Cfa and the second feedback capacitor Cfb are set such that Cfb/Cfa=9 holds. Note that the ratio of Cfb and Cfa is not limited to 9, and is set as necessary in accordance with the ratio of the voltage range. Details will be described later with reference to FIGS. 7 and 8.

The capacitance value of the output capacitor CQ may be arbitrary as long as an output voltage AMQ of the computation amplifier 71 is set within the range of VSL to VDL. For example, the capacitance value of the output capacitor CQ is set to about 1 to 10 times the sum of the capacitor circuit 10, the variable capacitance circuit 30 and the electrooptic panel side capacitance CP. As an example, in the case where the capacitance value of the output capacitor CQ is four times the above-mentioned sum, an error of 0.1 V of the output voltage VQ can be compensated by changing the output voltage AMQ of the computation amplifier 71 by 0.1 V×(5/4)=0.125 V.

Figure 5:
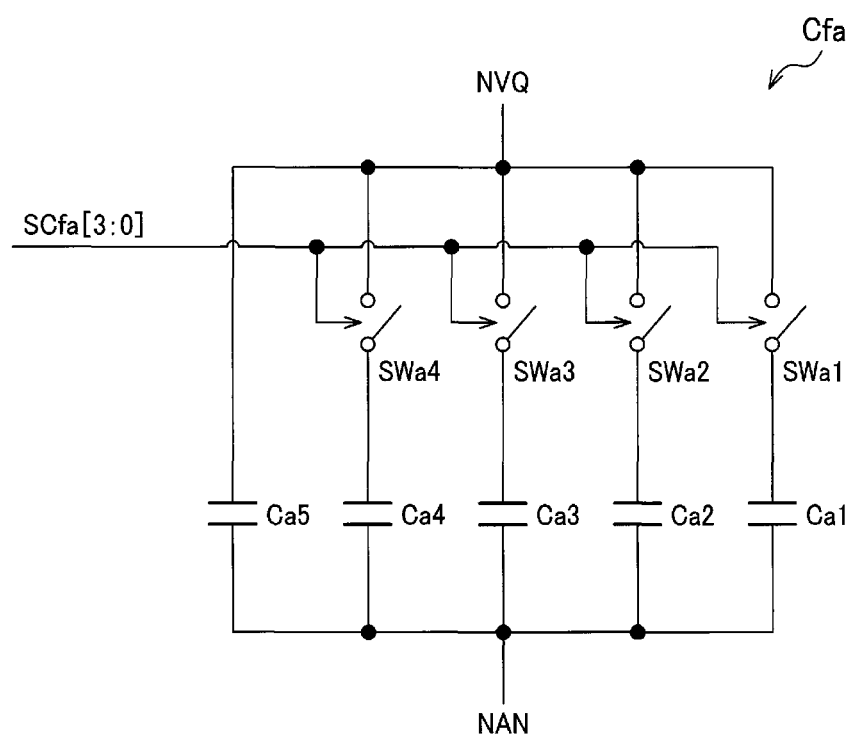
FIG. 5 illustrates a specific configuration example of a variable capacitance capacitor.

FIG. 5 illustrates a specific configuration example of a variable capacitance capacitor. FIG. 5 illustrates a specific configuration example of the first feedback capacitor Cfa, and the same applies to the configuration of the second feedback capacitor Cfb. It should be noted that the number of capacitors included in each feedback capacitor may be different.

The first feedback capacitor Cfa includes capacitors Ca1 to Ca5 and switches SWa1 to SWa4. One end of the switch SWa1 is coupled to the output node NVQ, and the other end is coupled to one end of the capacitor Ca1. The other end of the capacitor Ca1 is coupled to the inverting input node NAN of the computation amplifier 71. Likewise, one ends of the switches SWa2 to SWa4 are coupled to the output node NVQ, and the other ends are coupled to one ends of the capacitors Ca2 to Ca4. The other ends of the capacitors Ca2 to Ca4 are coupled to the inverting input node NAN of the computation amplifier 71. Note that the switches SWa1 to SWa4 may be provided on the side of the inverting input node NAN of the computation amplifier 71 than the capacitors Ca1 to Ca4. One end of the capacitor Ca5 is coupled to the output node NVQ, and the other end is coupled to the inverting input node NAN of the computation amplifier 71.

The capacitance values of the capacitors Ca1 to Ca4 are weighted in a binary manner. Specifically, Ca4=8×Ca1, Ca3=4×Ca1, and Ca2=2×Ca1 are set. The switch SWa1 is controlled on or off by a bit SCfa [0] of the setting data SCfa [3:0]. Likewise, the switches SWa2 to SWa4 are controlled on or off by bits SCfa [1] to SCfa [3] of the setting data SCfa [3:0].

Figure 6:
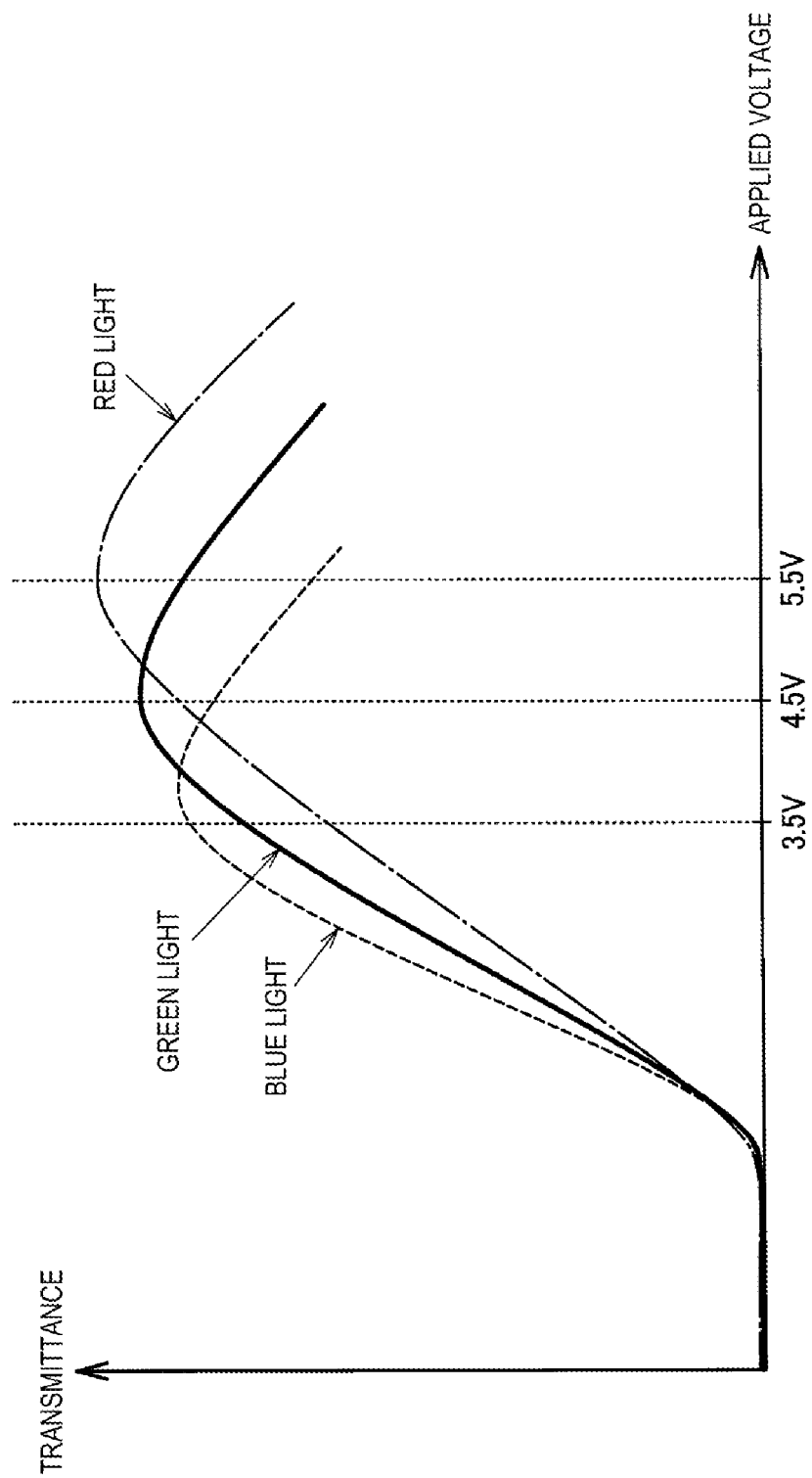
FIG. 6 illustrates a relationship between a color of light incident on a liquid crystal display panel and a transmittance characteristic of a pixel.

FIG. 6 illustrates a relationship between a color of light incident on liquid crystal display panel and a transmittance characteristic of a pixel. The abscissa indicates a voltage applied to a pixel, and the ordinate indicates the transmittance of a pixel for the applied voltage.

As illustrated in FIG. 6, the transmittance characteristic of the pixel differs depending on the color of light incident on liquid crystal display panel. More specifically, the longer the light wavelength, the more the peak of the transmittance characteristic is shifted to the high voltage side. In addition, the slope of the characteristics before reaching the peak of the transmittance characteristic differs depending on the color of the light. As a result, the applied voltage that achieves the same transmittance differs depending on the color of the light. In view of this, it is necessary to set an appropriate applied voltage range in accordance with the color of the light. In this embodiment, this corresponds to setting the voltage range of the output voltage VQ in accordance with the color of the light. For example, there are some models of projectors and the like in which a light source and a panel are provided for each of RGB, and in such models the range of the applied voltage is set in accordance with the color of the light source to which the panel corresponds.

Note that in some situation the range of the applied voltage of each color may be adjusted not only by the color of the light, but also by the type of the liquid crystal material, the gamma correction of the image, the white balance correction of the image, or the color development adjustment of the image. For example, in the case where the color development can be adjusted by the user, the range of the applied voltage of each color is set in accordance with the adjustment.

As described above, it is desirable that the voltage range of the output voltage VQ can be arbitrarily set. On the other hand, if the number of gradations or the voltage step of one gradation is changed, the image quality may possibly be reduced, and it is therefore desirable that they be not changed.

In this embodiment, in the configuration example of FIG. 4, the feedback gain Cfa/(Cfa+Cfb) from the output node NVQ to the inverting input node NAN of the computation amplifier 71 is adjusted. In this case, the number of gradations of the gradation data DTH [10:0] input to the first driving circuit 60 changes, while the number of gradations of the gradation data DTL [10:0] input to the D/A conversion circuit 72 and the output voltage range of the D/A conversion circuit 72 do not change. In this manner, the voltage range of the output voltage VQ is arbitrarily set while maintaining the number of gradations and the voltage step of one gradation.

Figure 7:
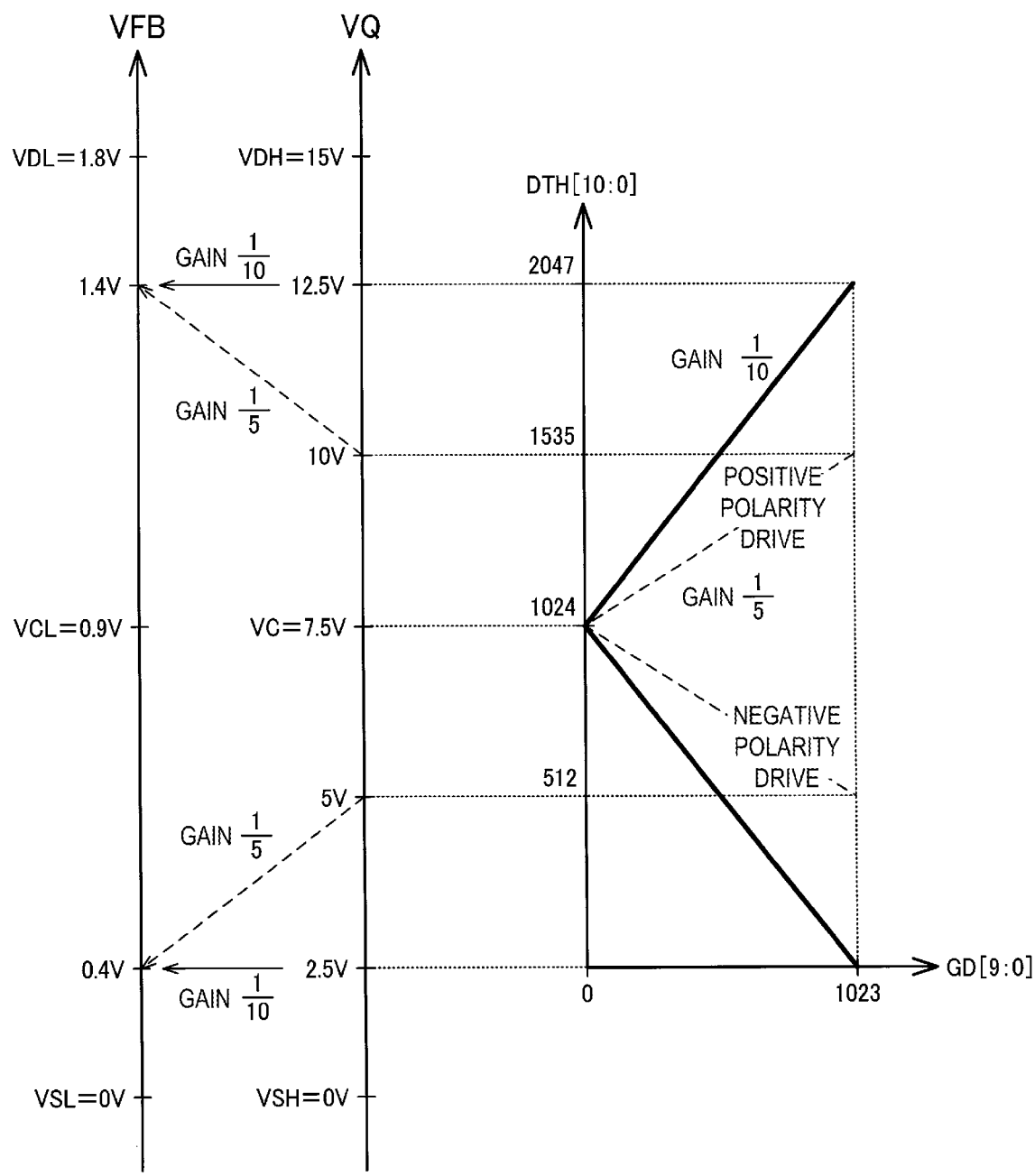
FIG. 7 illustrates a relationship between a voltage and gradation data input to the first driving circuit.
Figure 8:
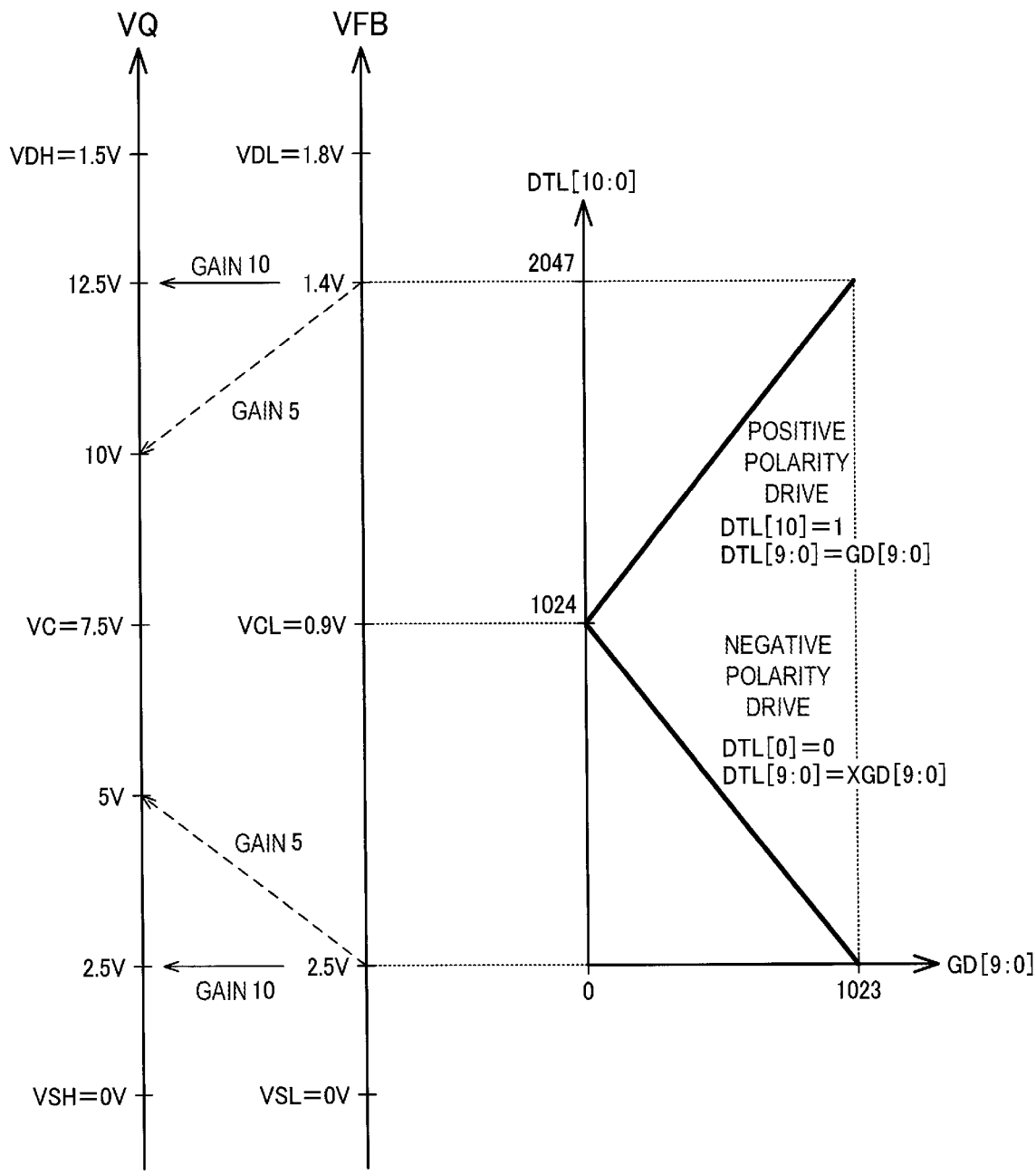
FIG. 8 illustrates a relationship between a voltage and gradation data input to the second driving circuit.

First, with reference to FIGS. 7 and 8, the relationship between the feedback gain, the gradation data and the voltage range is described.

FIG. 7 illustrates a relationship between a voltage and gradation data input to the first driving circuit. Here, an example in which the feedback gain is ¹⁄₁₀ and ⅕ is described, and it is assumed that the voltage range is maximized when the feedback gain is ¹⁄₁₀.

In FIG. 7, VSH=0 V and VDH=15 V are the low-potential side power source voltage and the high-potential side power source voltage of the first driving circuit 60. The common voltage supplied to the opposite electrode of the electrooptic panel 200 is VC=7.5 V. In addition, VSL=0 V and VDL=1.8 V are the low-potential side power source voltage and the high-potential side power source voltage of the second driving circuit 70. The voltage corresponding to the common voltage VC=7.5 V is set to VCL=0.9 V.

The processing circuit 42 converts the input gradation data GD [9:0] into the gradation data DTH [10:0]. When the feedback gain is ¹⁄₁₀, the processing circuit 42 converts the GD [9:0] of the gradation values 0 to 1023 into the DTH [10:0] of the gradation values 1023 to 0 in the negative polarity drive, and converts the GD [9:0] of the gradation values 0 to 1023 into the DTH [10:0] of the gradation values 1024 to 2047 in the positive polarity drive. The range of the output voltage VQ is 10 V with the common voltage VC=7.5 V at the center, i.e., 2.5 V to 12.5 V. The common voltage of the inverting input node NAN of the computation amplifier 71 is set to VCL=VREF=0.9 V. The range 10 V of the output voltage VQ is fed back by the gain ¹⁄₁₀, and therefore the range of the voltage VFB of the inverting input node NAN is 1 V with 0.9 V at the center, i.e., V to 1.4 V.

When the feedback gain is ⅕, the processing circuit 42 sets the number of gradations of the DTH [10:0] to (¹⁄₁₀)/(⅕)=½. Specifically, the processing circuit 42 converts the GD [9:0] of the gradation values 0 to 1023 into the DTH [10:0] of the gradation values 1023 to 512 in the negative polarity drive, and converts the GD [9:0] of the gradation values 0 to 1023 into the DTH [10:0] of the gradation values 1024 to 1535 in the positive polarity drive. The range of the output voltage VQ is 5 V with the common voltage VC=7.5 V at the center, i.e., 5 V to 10 V. The range 10 V of the output voltage VQ is fed back by the gain ⅕, and therefore the range of the voltage VFB of the inverting input node NAN is 1 V with V at the center, i.e., 0.4 V to 1.4 V.

FIG. 8 illustrates a relationship between a voltage and gradation data input to the second driving circuit.

The processing circuit 42 converts the input gradation data GD [9:0] into the gradation data DTL [10:0]. More specifically, the processing circuit 42 sets the DTL [10]=1 and DTL [9:0]=GD [9:0] in the negative polarity drive, and sets the DTL [10]=0 and DTL [9:0]=XGD [9:0] in the positive polarity drive. The XGD [9:0] is data obtained through logic inversion of each bit of the GD [9:0]. The D/A conversion circuit 72 D/A-converts the gradation data DTL [10:0]=0 to 2047 into the voltage range of 0.4 V to 1.4 V.

The gain of the second driving circuit 70 is the inverse (Cfa+Cfb)/Cfa of the feedback gain. Specifically, when the feedback gain is ¹⁄₁₀, the output voltage range 0.4 V to 1.4 V of the D/A conversion circuit 72 is amplified by 10 times the gain, and therefore the voltage range of the output voltage is VQ 2.5 V to 12.5 V. When the feedback gain is ⅕, the output voltage range 0.4 V to 1.4 V of the D/A conversion circuit 72 is amplified by 5 times the gain, and therefore the voltage range of the output voltage VQ is 5 V to 10 V.

As described above, even when the number of gradations of the DTH [10:0] changes, the range of the voltage VFB of the inverting input node NAN does not change. The non-inverting input node NAP and the inverting input node NAN of the computation amplifier 71 are subjected to the virtual short by the computation amplifier 71, and therefore no change of the feedback voltage range is equivalent to no change of the output voltage range of the D/A conversion circuit 72. In this manner, as described with FIG. 8, the voltage step of one gradation and the number of gradations of the D/A conversion circuit 72 are maintained. When the number of gradations of the DTH [10:0] changes, the number of gradations of the drive of the first driving circuit 60 changes, while the difference between the target voltage and the output voltage VQ of the first driving circuit 60 is corrected by the second driving circuit 70 as described later with reference to FIG. 9. That is, when the voltage step of one gradation and the number of gradations of the second driving circuit 70 are maintained, the number of gradations and the voltage step of one gradation can be maintained as the final output including the second driving circuit 70.

Figure 9:
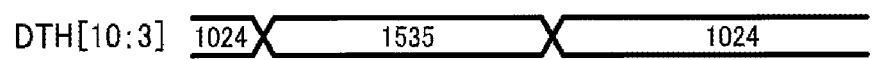
FIG. 9 illustrates a first waveform example for describing operations of the first driving circuit and the second driving circuit.
Figure 9:
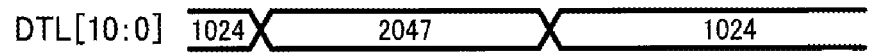
Figure 9:
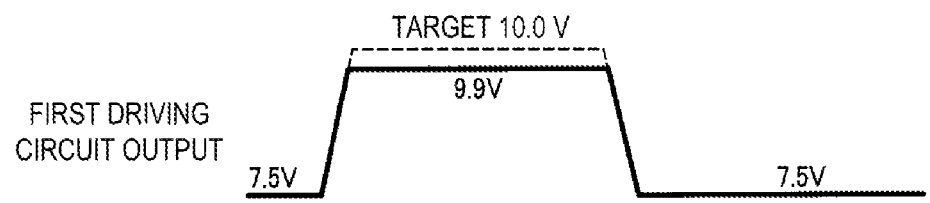
Figure 9:
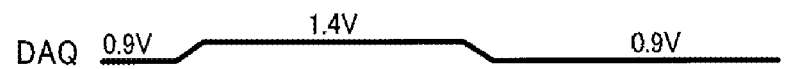
Figure 9:
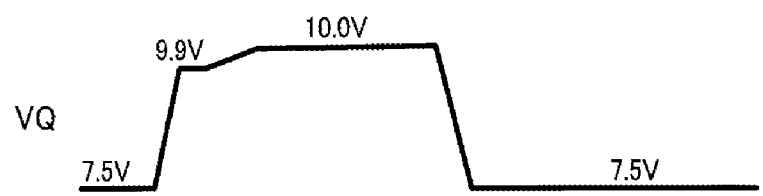
Figure 9:
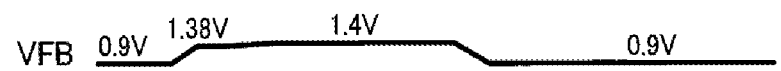
Figure 9:

FIG. 9 illustrates a first waveform example for describing operations of the first driving circuit and the second driving circuit. FIG. 9 illustrates a waveform example in the case where a feedback gain is ⅕.

It is assumed that the gradation value of the gradation data DTH [10:0] changes to 1024, 1535, and 1024, and the gradation value of the DTL [10:0] changes to 1024, 2047 and 1024. The target voltage corresponding to the DTH [10:0]=1535 is 10.0 V.

It is assumed that in the case where the second driving circuit 70 is not provided and the driving is performed only with the first driving circuit 60, the output voltage VQ changes from 7.5 V to 9.9 V when the gradation value changes from 1024 to 1535. The difference from the target voltage 10.0 V is 0.1 V. An operation of the second driving circuit 70 in this case is described below.

When the gradation value changes from 1024 to 2047, the D/A conversion circuit 72 sets the D/A conversion voltage DAQ from 0.9 V to 1.4 V. The output voltage VQ is changed from 7.5 V to 9.9 V by the first driving circuit 60, a voltage VFB of the inverting input node NAN of the computation amplifier 71 changes from 0.9 V to 0.9 V+(9.9 V−7.5 V)/5=1.38 V. The computation amplifier 71 sets the output voltage AMQ from 0.9 V to 0.9 V+(10.0 V−9.9 V)×(5/4)=1.025 V to set VFB=DAQ=1.4 V. In this manner, the output voltage VQ is set to the target voltage of 10.0 V, and the voltage VFB is set to 1.4 V.

In this manner, the second driving circuit 70 corrects the output voltage of the first driving circuit 60, and thus the output voltage VQ is determined. Since the voltage step of one gradation and the number of gradations of the second driving circuit 70 are not changed by the feedback gain as described above, the voltage range applied to the pixel can be changed without changing the voltage step of one gradation and the number of gradations of the data voltage output by data line driving circuit 110.

Figure 10:
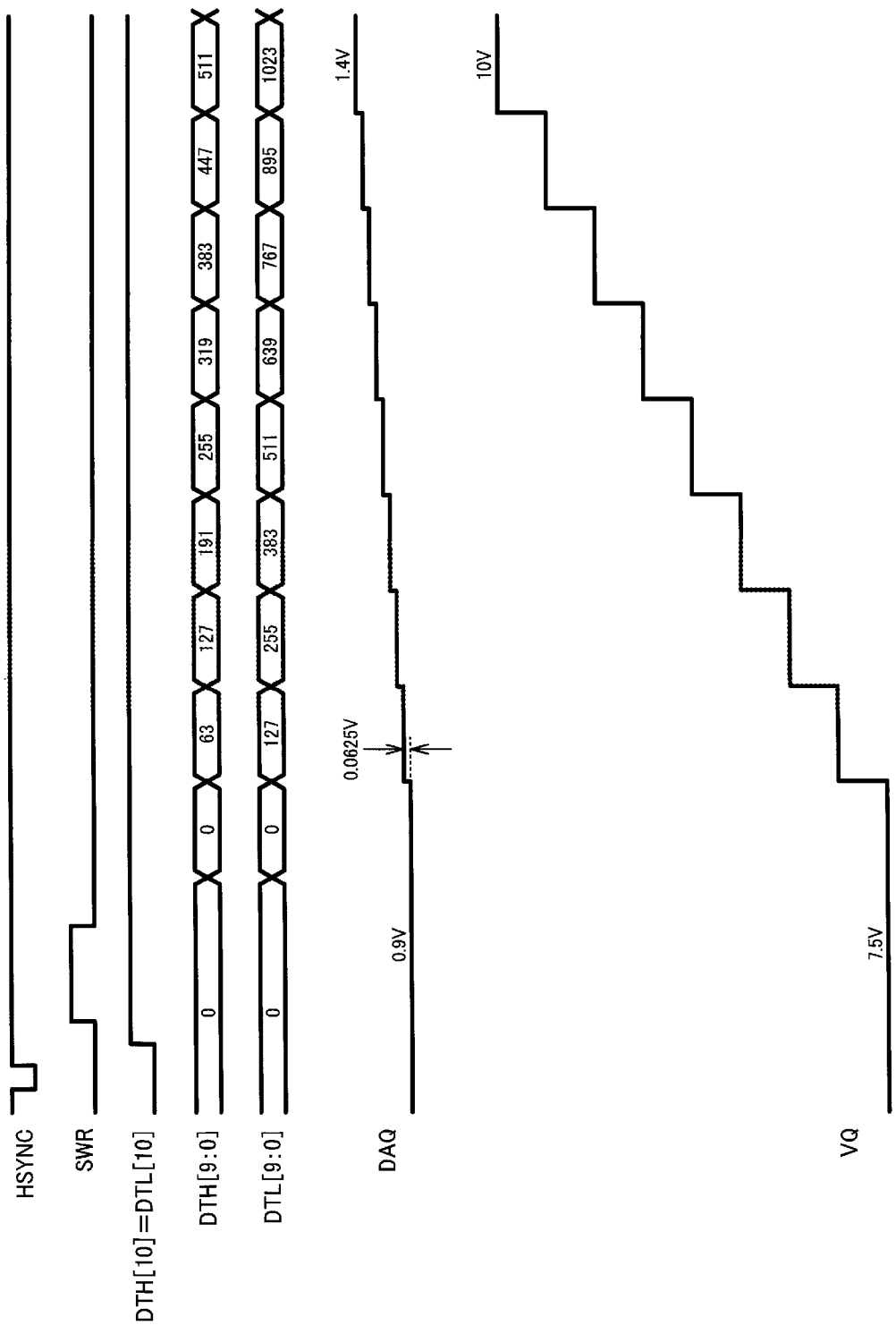
FIG. 10 illustrates a second waveform example for describing operations of the first driving circuit and the second driving circuit.

FIG. 10 illustrates a second waveform example for describing operations of the first driving circuit and the second driving circuit. FIG. 10 illustrates a waveform example of a case where the feedback gain is set to ⅕ in the horizontal scanning period in the positive polarity drive period of the polarity inversion drive. While an example in which the gradation values 0, 127, 1023 are sequentially written to nine pixels is described here, the number of pixels driven in the horizontal scanning period and the gradation value written to each pixel may be arbitrary.

The rising edge of a horizontal synchronization signal HSYNC is set as the start timing of the horizontal scanning period. After the horizontal scanning period is started, the processing circuit 42 outputs the DTH [9:0]=DTL [9:0]=0, and sets the DTH [10]=DTL [10] from 0 to 1. In this case, 0 is the low level and 1 is the high level. This corresponds to the DTH [10:0]=DTL [10:0]=1024, and therefore the D/A conversion voltage DAQ=0.9 V and the output voltage VQ=7.5 V are obtained.

Next, the initialization switch SWR turns from off to on, and from on to off. Here, off is the low level, and on is the high level. When the initialization switch SWR is on, the voltage VFB of the inverting input node NAN of the computation amplifier 71 is initialized to the reference voltage VREF=0.9 V. Note that the period in which the initialization of the voltage VFB is performed is referred to as initialization period. In FIG. 10, the period in which the initialization switch SWR is on corresponds to the initialization period.

Next, writing to the pixel is started. The processing circuit 42 sequentially outputs the DTL [9:0] of the gradation values 0, 127, . . . , 1023 and the DTH [9:0] of the gradation values 0, 63, . . . , 511. As a result, the D/A conversion voltage DAQ sequentially changes from 0.9 V to 1.4 V, and the output voltage VQ sequentially changes from 7.5 V to 10 V. Note that while the gradation value for which the voltage range is easy to understand is exemplified here, the gradation value written to each pixel may be arbitrary as described above.

Figure 11:
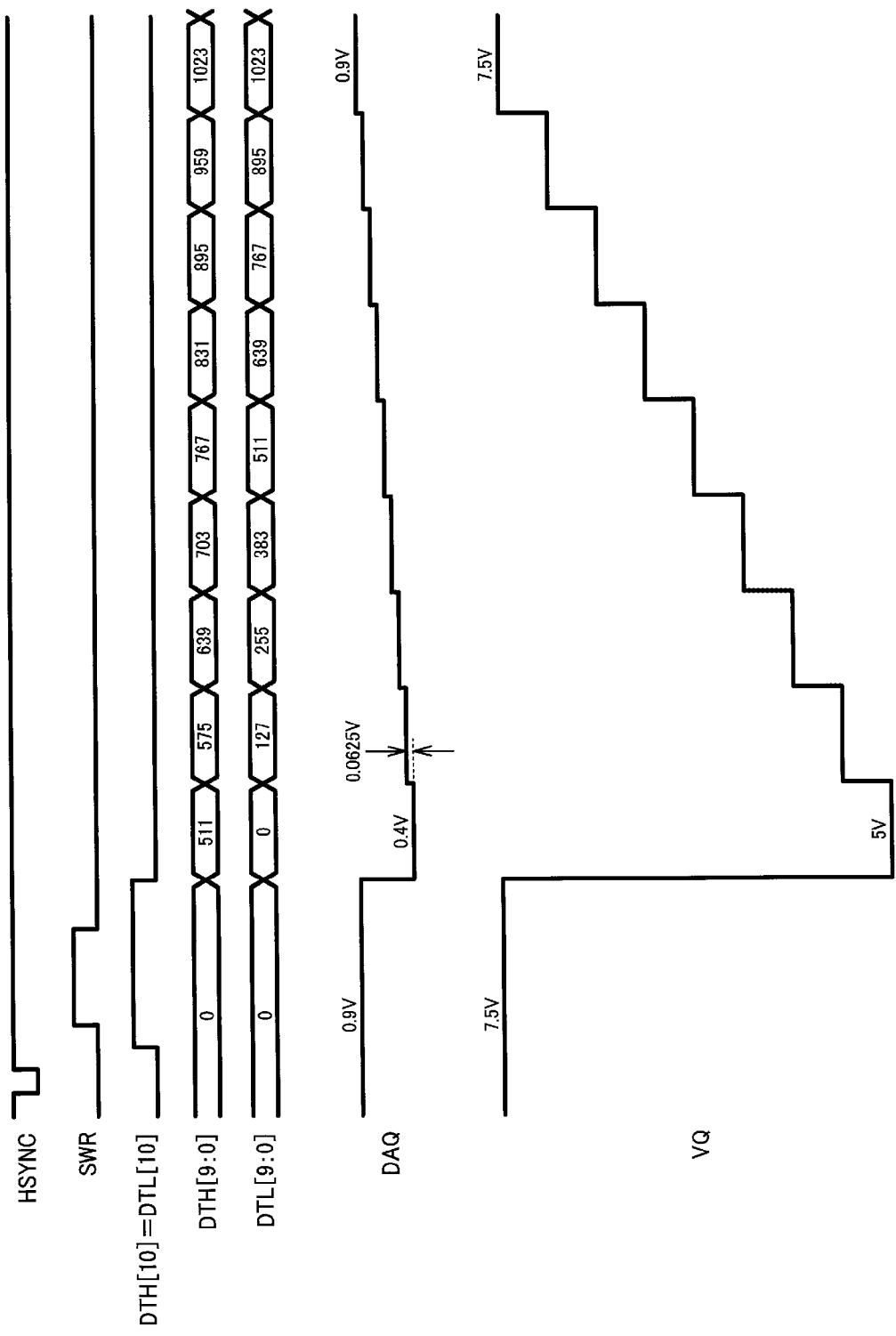
FIG. 11 illustrates a third waveform example for describing operations of the first driving circuit and the second driving circuit.

FIG. 11 illustrates a third waveform example for describing operations of the first driving circuit and the second driving circuit. FIG. 11 illustrates a waveform example of a case where the feedback gain is set to ⅕ in the negative polarity drive period of the polarity inversion drive.

After the horizontal scanning period is started, the processing circuit 42 outputs the DTH [9:0]=DTL [9:0]=0, and sets the DTH [10]=DTL [10] from 0 to 1. This corresponds to the DTH [10:0]=DTL [10:0]=1024, and therefore the D/A conversion voltage DAQ=0.9 V and the output voltage VQ=7.5 V are obtained.

Next, the initialization switch SWR turns from off to on, and from on to off. When the initialization switch SWR is on, the voltage VFB of the inverting input node NAN of the computation amplifier 71 is initialized to the reference voltage VREF=VCL=0.9 V.

Next, the processing circuit 42 sets DTH [10]=DTL [10] from 1 to 0. Next, writing to the pixel is started. The processing circuit 42 sequentially outputs the DTL [9:0] of the gradation values 0, 127, . . . , 1023 and the DTH [9:0] of the gradation values 511, 757, . . . , 1023. As a result, the D/A conversion voltage DAQ sequentially changes from 0.4 V to 0.9 V, and the output voltage VQ sequentially changes from 5 V to 7.5 V. Note that while the gradation value for which the voltage range is easy to understand is exemplified here, the gradation value written to each pixel may be arbitrary.

In the above-mentioned embodiment, the driver 100 includes the first driving circuit 60 and the second driving circuit 70. The first driving circuit 60 supplies a data signal to the signal supply line of the electrooptic panel 200 on the basis of the gradation data GD [9:0]. The second driving circuit 70 includes the computation amplifier 71, the output capacitor CQ, the first feedback capacitor Cfa, and the second feedback capacitor Cfb. One end of the output capacitor CQ is electrically coupled to the output node NAMQ of the computation amplifier 71, and the other end is electrically coupled to signal supply line. One end of the first feedback capacitor Cfa is electrically coupled to the inverting input node NAN of the computation amplifier 71, and the other end is electrically coupled to the signal supply line. One end of the second feedback capacitor Cfb is electrically coupled to the inverting input node NAN of the computation amplifier 71, and the other end is electrically coupled to a predetermined potential node. The second driving circuit 70 is electrically coupled to the signal supply line. At least one of the first feedback capacitor Cfa and the second feedback capacitor Cfb is a capacitor with a variable capacitance value.

According to this embodiment, since the capacitance value of at least one of the first feedback capacitor Cfa and the second feedback capacitor Cfb is variable, the feedback gain from the signal supply line to the inverting input node NAN of the computation amplifier 71, and the gain of the second driving circuit 70 can be varied. In this manner, the voltage range of the data voltage output to the signal supply line can be changed without changing the voltage step of one gradation and the number of gradations of the second driving circuit 70. It is necessary to change the range of the voltage applied to the pixel depending on the color of the light incident on the electrooptic panel 200 as described above, but according to this embodiment, the range of the voltage applied to the pixel can be changed while maintaining the number of gradations and the voltage step of one gradation.

Note that the electrical coupling is coupling that enables transmission of an electric signal and transmission of information using an electric signal. The electrical coupling may be coupling via an active element and the like.

In addition, in this embodiment, the second driving circuit 70 includes the D/A conversion circuit 72. The D/A conversion circuit 72 supplies the D/A conversion voltage DAQ based on the gradation data GD [9:0] to the inverting input node NAN of the computation amplifier 71.

According to this embodiment, when there is a difference between the D/A conversion voltage DAQ and the voltage VFB fed back to the inverting input node NAN of the computation amplifier 71 from the signal supply line, the computation amplifier 71 supplies a charge to the signal supply line through the output capacitor CQ, and thus the difference between the voltage of the signal supply line and the target voltage corresponding to the gradation data GD [9:0] can be corrected. In this manner, even when there is an error between the voltage output to the signal supply line by the first driving circuit 60 and the target voltage, the error can be corrected by the second driving circuit 70.

In addition, since the above-mentioned error is considered to be sufficiently small compared to the target voltage, the amount of the electric charge that should be supplied by the computation amplifier 71 can be considered to be small. As a result, the voltage change of the output node NAMQ of the computation amplifier 71 is small, and thus the computation amplifier 71 can be composed of a transistor with a breakdown voltage lower than the breakdown voltage of the transistor making up the first driving circuit 60.

In addition, in this embodiment, the computation amplifier 71 is composed of a transistor with a breakdown voltage lower than the breakdown voltage of the transistor making up the first driving circuit 60.

According to this embodiment, the output node NAMQ of the computation amplifier 71 and the signal supply line are coupled by the output capacitor CQ, and the inverting input node NAN of the computation amplifier 71 and the signal supply line are coupled by the first feedback capacitor Cfa. In this manner, the computation amplifier 71 and the signal supply line are DC disconnected, and thus the computation amplifier 71 can be composed of a transistor with a breakdown voltage lower than the breakdown voltage of the transistor making up the first driving circuit 60.

In addition, in this embodiment, the length of the distance between the source and the drain of the transistor making up the first driving circuit 60 is greater than the length of the distance between the source and the drain of the transistor making up the second driving circuit 70. Alternatively, the film thickness of the gate insulating film of the transistor making up the first driving circuit 60 is greater than the film thickness of the gate insulating film of the transistor making up the second driving circuit 70.

According to this embodiment, the transistor making up the second driving circuit 70 including the computation amplifier 71 can be composed of a transistor with a breakdown voltage lower than the breakdown voltage of the transistor making up the first driving circuit 60.

In addition, the voltage of the signal supply line is divided by the first feedback capacitor Cfa and the second feedback capacitor Cfb and fed back to the inverting input node NAN of the computation amplifier 71. In this manner, a voltage lower than the voltage of the signal supply line is applied to the inverting input node NAN of the computation amplifier 71, and thus the computation amplifier 71 can be composed of a transistor with a breakdown voltage lower than the breakdown voltage of the transistor making up the first driving circuit 60.

In addition, since the computation amplifier 71 is composed of a transistor with a breakdown voltage lower than the breakdown voltage of the transistor making up the first driving circuit 60, the computation amplifier 71 can be composed of a transistor with high mobility. In this manner, the frequency response characteristic and the amplification factor of the computation amplifier can both be achieved. For example, regarding the necessity to increase the frequency response characteristic of the computation amplifier to increase the drive speed in accordance with higher resolution, the frequency response characteristic can be increased while maintaining the amplification factor of the computation amplifier, and the power consumption of the computation amplifier can be suppressed.

In addition, in this embodiment, the capacitance value of the second feedback capacitor Cfb is greater than the capacitance value of the first feedback capacitor Cfa.

The gain of the second driving circuit 70 is (Cfa+Cfb)/Cfa. According to this embodiment, since the gain is greater than 2, the range of the voltage applied to the computation amplifier 71 is smaller than ½ of the voltage range of the signal supply line. In this manner, the computation amplifier 71 can be composed of a transistor with a breakdown voltage lower than the breakdown voltage of the transistor making up the first driving circuit 60.

In addition, in this embodiment, the driver 100 includes the processing circuit 42 that outputs second gradation data DTH [10:0] obtained by multiplying the gradation data GD [9:0] by the gain corresponding to the variable capacitance value. The first driving circuit 60 supplies a data signal to the signal supply line on the basis of the second gradation data DTH [10:0].

According to this embodiment, the first driving circuit 60 outputs the data voltage based on the second gradation data DTH [10:0] obtained by multiplying the gradation data GD [9:0] by the gain corresponding to the variable capacitance value, and thus its voltage range changes in accordance with the gain. The feedback gain and the gain for changing the voltage range are canceled, and thus the voltage range fed back to the inverting input node NAN of the computation amplifier 71 can be made constant. In this manner, the voltage range of the data voltage output to the signal supply line can be changed without changing the voltage step of one gradation and the number of gradations of the second driving circuit 70.

Note that in the example of FIG. 7, the gain corresponding to the variable capacitance value is (1/10)/(1/10)=1 when the feedback gain is 1/10, and is (1/10)/(1/5)=1/2 when the feedback gain is 1/5. The multiplication process is not limited to the computation of simply multiplying the gain. In the example of FIG. 7, the multiplication process is a process of multiplying the slope of the second gradation data DTH [10:0] by 1 or ½ with 1024 as the reference.

In addition, in this embodiment, the first feedback capacitor Cfa includes a first switch group and a first capacitor group in which a plurality of pairs of the switch and the capacitor disposed in series between the signal supply line and the inverting input node NAN of the computation amplifier 71 is disposed in parallel to each other. The second feedback capacitor Cfb includes a second switch group and a second capacitor group in which a plurality of pairs of the switch and the capacitor disposed in series between the inverting input node NAN of the computation amplifier 71 and the predetermined potential node are disposed in parallel to each other.

According to this embodiment, when each switch of the first switch group is turned on or off, the capacitor coupled in series with the switch that is on in the first capacitor group is coupled between the signal supply line and the inverting input node NAN of the computation amplifier 71. In this manner, the capacitance value of the first feedback capacitor Cfa is controlled in a variable manner. Likewise, when each switch of the second switch group is turned on or off, the capacitance value of the second feedback capacitor Cfb is controlled in a variable manner.

Note that in the example of FIG. 5, the capacitors Ca1 to Ca4 correspond to the first capacitor group, and the switches SWa1 to SWa4 correspond to the first switch group. For example, the switch SWa1 and the capacitor Ca1 are coupled in series and paired. In the example illustrated in FIG. 5, four such pairs are connected in parallel.

In addition, in this embodiment, the driver 100 includes the initialization switch SWR. The initialization switch SWR turns on in the initialization period, and supplies the reference voltage VREF to the inverting input node NAN of the computation amplifier 71.

According to this embodiment, the inverting input node NAN of the computation amplifier 71 changes with respect to the reference voltage VREF. When the range of the D/A conversion voltage DAQ is represented by VREF−ΔV1 to VREF+ΔV2, it suffices to set the reference voltage VREF such that VREF−ΔV1 is higher than the low-potential side power source voltage VSL of the second driving circuit 70, and that VREF+ΔV2 is lower than the high-potential side power source voltage VDL of the second driving circuit 70.

In addition, in this embodiment, the first driving circuit 60 includes the capacitor driving circuit 20 and the capacitor circuit 10. The capacitor driving circuit 20 outputs first to n-th capacitor drive voltages corresponding to the gradation data DTH [10:0] to first to n-th capacitor driving nodes NDR1 to NDRn. Here, n is an integer of 2 or more. The capacitor circuit 10 includes the first to n-th capacitors C1 to Cn disposed between the signal supply line and the first to n-th capacitor driving nodes NDR1 to NDRn.

According to this embodiment, the capacitor driving circuit 20 outputs the first to n-th capacitor drive voltages corresponding to the gradation data DTH [10:0], and thus the first to n-th capacitors C1 to Cn output the charge of the electric charge amount corresponding to the gradation data DTH [10:0] to the signal supply line. In this manner, the voltage corresponding to the gradation data DTH [10:0] is output to the signal supply line. Since this driving is not feedback-controlled, errors may be caused between the voltage output through the driving and the target voltage. The second driving circuit 70 can correct the error through a feedback-control.

3. Second Embodiment

Figure 12:
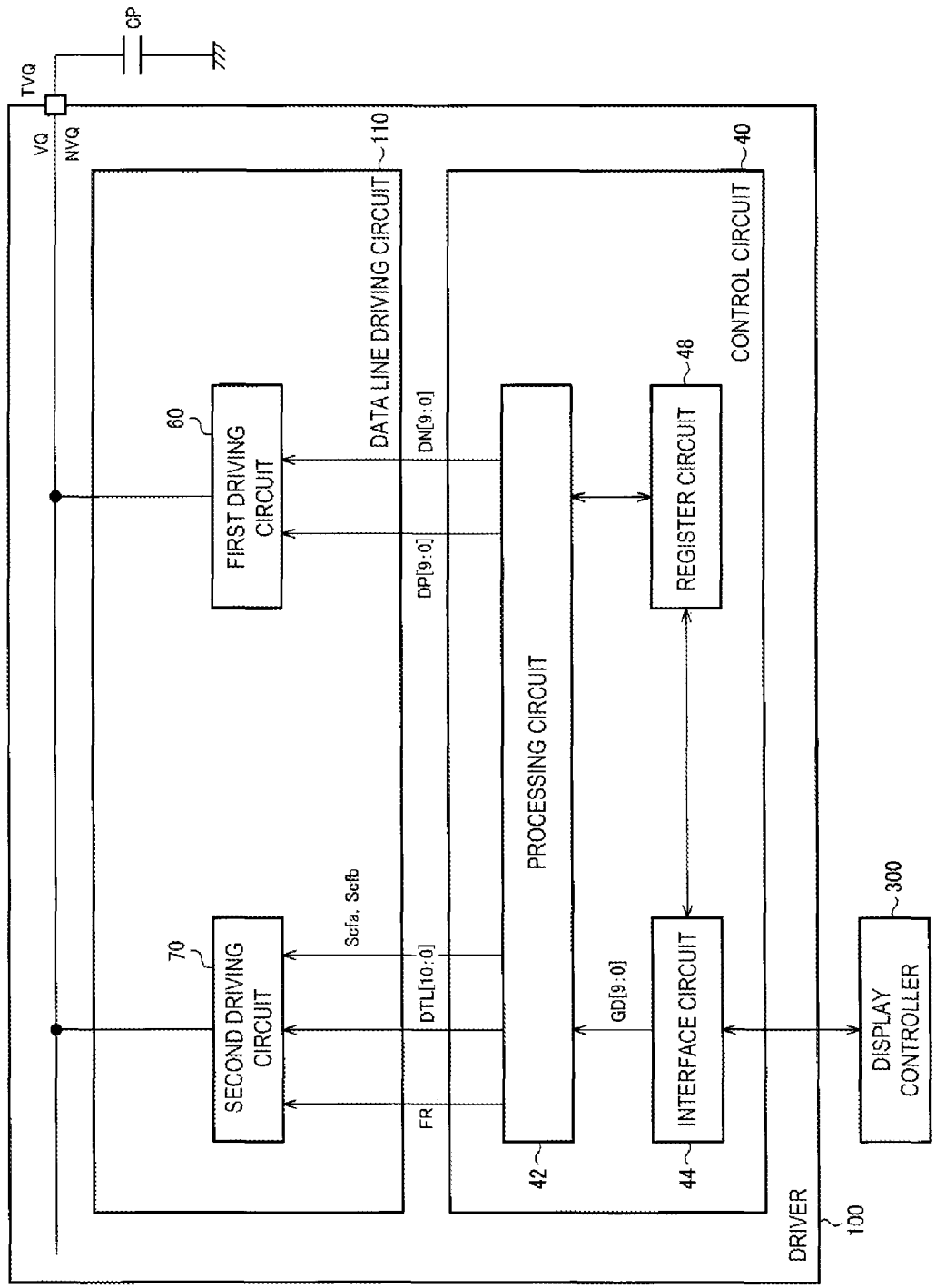
FIG. 12 illustrates a second specific configuration example of a driver.

FIG. 12 illustrates a second specific configuration example of a driver. In this configuration example, the data line driving circuit 110 includes the first driving circuit 60 and the second driving circuit 70. In addition, the processing circuit 42 outputs setting data DP [9:0], DN [9:0] for setting the driving capability of the first driving circuit 60 on the basis of the gradation data GD [9:0]. Note that the configuration and operation of the second driving circuit 70 are the same as in the first embodiment, and therefore the configuration and operation of the first driving circuit 60 are mainly described below.

Figure 13:
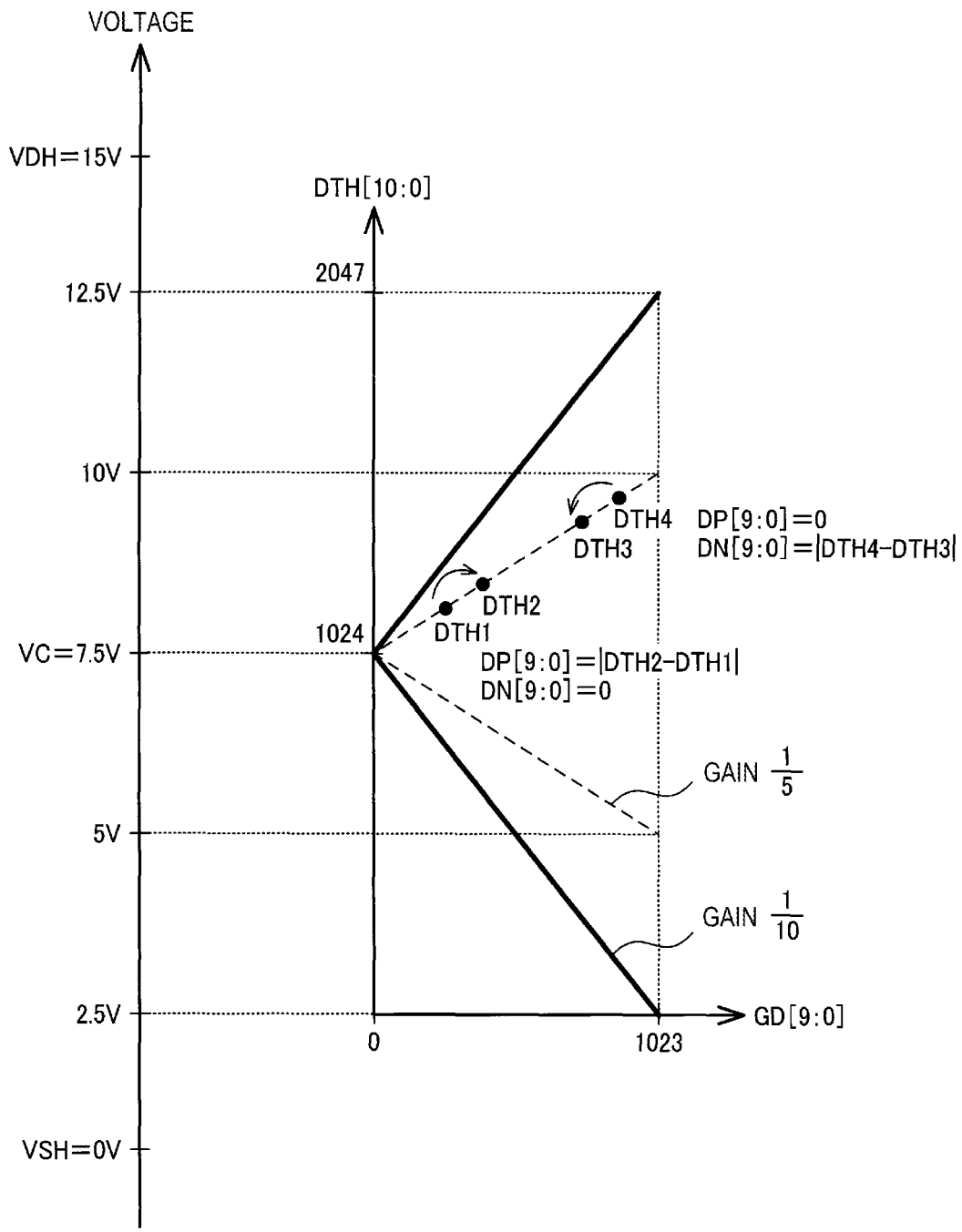
FIG. 13 is a diagram illustrating a relationship between gradation data, setting data and a data voltage.

FIG. 13 is a diagram illustrating a relationship between gradation data, setting data and a data voltage. The relationship between the gradation data GD [9:0], the gradation data DTH [10:0] and the data voltage are the same as in FIG. 7. While FIG. 13 illustrates a computation example of DP and DN when the feedback gain is ⅕, the computation method is the same regardless of the feedback gain.

It is assumed that a certain pixel is driven by a gradation value DTH1, that the next pixel is driven by a gradation value DTH2, and that DTH2−DTH1>0 holds. In this case, the processing circuit 42 outputs DP [9:0]=|DTH2−DTH1|, DN [9:0]=0. It is assumed that a certain pixel is driven by a gradation value DTH3, that the next pixel is driven by a gradation value DTH4, and that DTH4−DTH3<0 holds. In this case, the processing circuit 42 outputs DP [9:0]=0, DN [9:0]=|DTH4−DTH3|. While FIG. 13 illustrates an example of the positive polarity drive, and the same applies to the negative polarity drive.

Note that since DTH [10] cancels when the difference is taken, the DP [9:0] and DN [9:0] can be directly computed from the gradation data GD [9:0], not through DTH [10:0].

Figure 14:
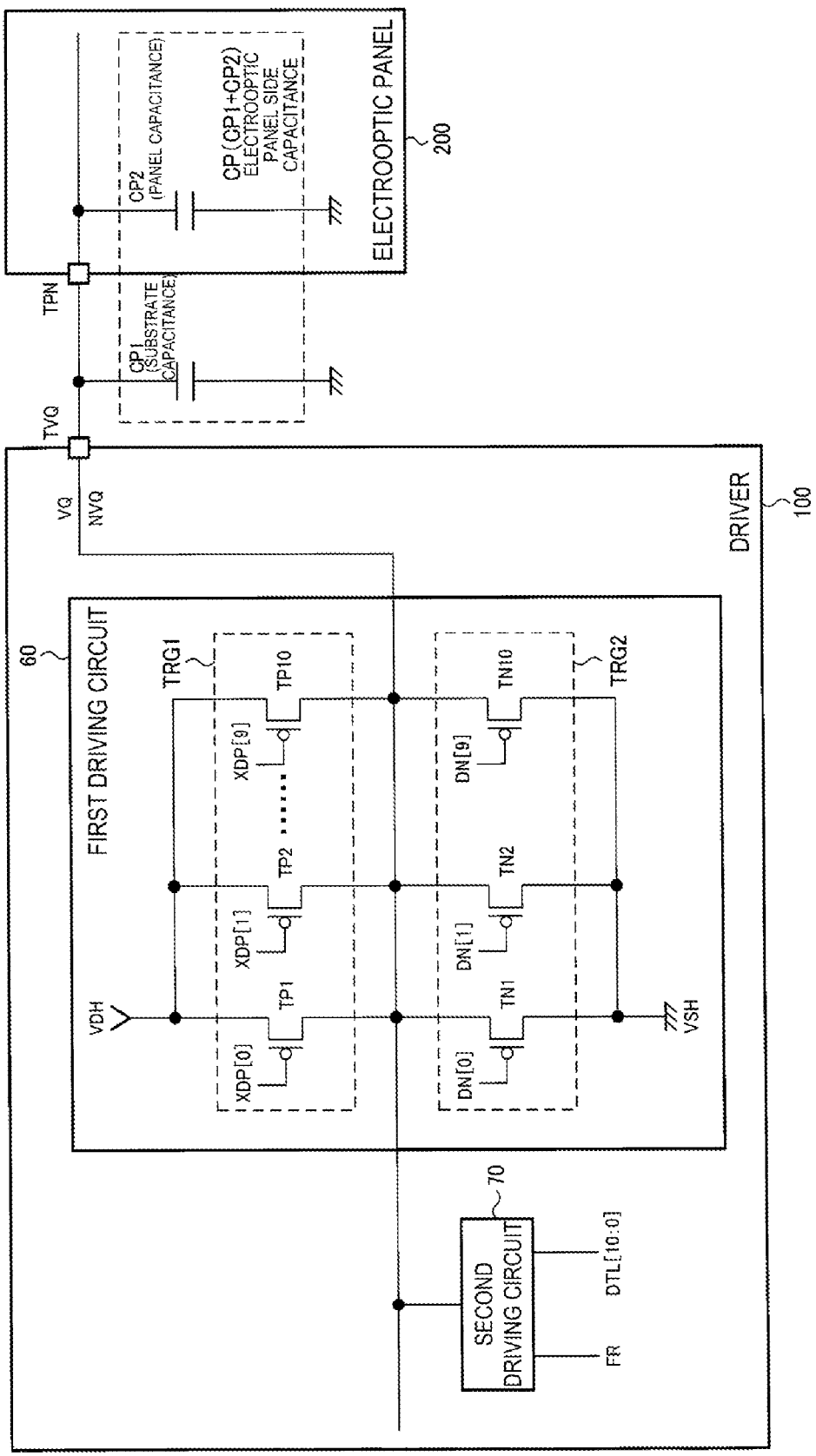
FIG. 14 illustrates a second specific configuration example of the first driving circuit.

FIG. 14 illustrates a second specific configuration example of the first driving circuit. In this configuration example, the first driving circuit 60 includes a first driving transistor group TRG1 and a second driving transistor group TRG2.

The first driving transistor group TRG1 includes P-type transistors TP1 to TP10 coupled in parallel between the node of the high-potential side power source voltage VDH and the output node NVQ. A bit signal XDP [0] is input to the gate of the P-type transistor TP1. Likewise, bit signals XDP [1] to XDP [9] are input to the gates of the P-type transistors TP2 to TP10. XDP [9:0] is data obtained through the logic inversion of each bit of the DP [9:0]. The driving capabilities of the P-type transistors TP1 to TP10 are binary weighted. Specifically, the driving capability of P-type transistor TPi is $2^{(i-1)}$ times the driving capability of the P-type transistor TP1. The driving capability is adjusted by the gate width of the transistor or the number of the unit transistors coupled in parallel, for example.

The second driving transistor group TRG2 includes N-type transistors TN1 to TN10 coupled in parallel between the output node NVQ and the low-potential side power source voltage VSH. A bit signal DN [0] is input to the gate of the N-type transistor TN1. Likewise, bit signals DN [1] to DN [9] are input to the gates of the N-type transistors TN2 to TN10. The driving capabilities of the N-type transistors TN1 to TN10 are binary weighted. Specifically, the driving capability of the N-type transistor TNi is $2^{(i-1)}$ times the driving capability of the N-type transistor TN1.

For example, the current that is supplied when the P-type transistor TP1 is on is referred to as Itp1, and the on period in which one pixel is driven is referred to as ton. The charge supplied by the P-type transistor TP1 to the output node NVQ is Itp1×ton, and the change of the output voltage VQ due to the charge is (Itp1×ton)/CP. Itp1 is set, i.e., the driving capability of the P-type transistor TP1 is set such that this voltage change corresponds to 1LSB.

Figure 15:
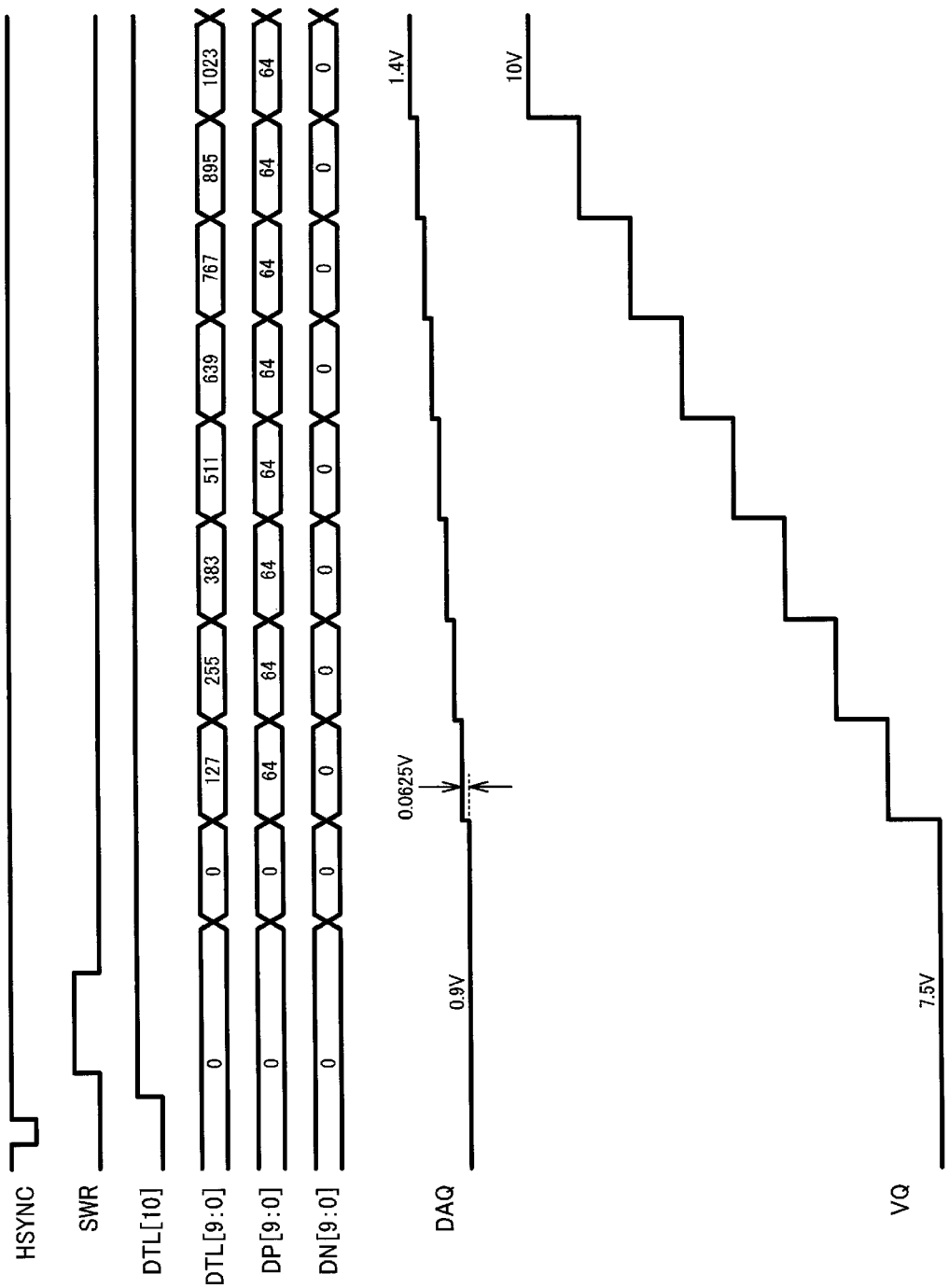
FIG. 15 illustrates a fourth waveform example for describing operations of the first driving circuit and the second driving circuit.

FIG. 15 illustrates a fourth waveform example for describing operations of the first driving circuit and the second driving circuit. FIG. 15 illustrates a waveform example when the feedback gain is set to ⅕ in the positive polarity drive period.

After the horizontal scanning period is started, the processing circuit 42 outputs the DTL [9:0]=DP [9:0]=DN [9:0]=0, and sets the DTL [10] from 0 to 1. This corresponds to the DTL [10:0]=1024, and therefore the D/A conversion voltage DAQ=0.9 V and the output voltage VQ=7.5 V are obtained.

Next, the initialization switch SWR turns from off to on, and from on to off. When the initialization switch SWR is on, the voltage VFB of the inverting input node NAN of the computation amplifier 71 is initialized to the reference voltage VREF=VCL=0.9 V.

Next, writing to the pixel is started. The processing circuit 42 sequentially outputs the DTL [9:0] of the gradation values 0, 127, . . . , 1023, and sequentially outputs the DP [9:0]=0, 64, 64, . . . , 64. As a result, the D/A conversion voltage DAQ sequentially changes from 0.9 V to 1.4 V, and the output voltage VQ sequentially changes from 7.5 V to 10 V. Note that while FIG. 15 illustrates an example of DP [9:0]>0 and DN [9:0]=0, DP [9:0]=0 and DN [9:0]>0 are obtained in the case where the gradation value of the DTL [9:0] decreases. Note that while the gradation value for which the voltage range is easy to understand is exemplified here, the gradation value written to each pixel may be arbitrary.

For the negative polarity drive period, the illustration of the waveform is omitted. In the negative polarity drive period, the waveforms of the SWR, DTL [9:0], DP [9:0], and DN [9:0] are the same as in FIG. 15. The waveforms of the DTL [10], DAQ and VQ are the same as in FIG. 11.

In the above-mentioned embodiment, the driver 100 includes the control circuit 40 that controls the first driving circuit 60. The first driving circuit 60 includes the first driving transistor group TRG1 disposed between the signal supply line and the node to which the high-potential side power source voltage VDH is supplied, and the second driving transistor group TRG2 disposed between the signal supply line and the node to which the low-potential side power source voltage VSH is supplied. The control circuit 40 controls on or off each transistor of the first driving transistor group TRG1 or each transistor of the second driving transistor group TRG2 on the basis of the gradation data GD [9:0].

According to this embodiment, of the first driving transistor group TRG1 or the second driving transistor group TRG2, the transistor turned on based on the gradation data GD [9:0] outputs the charge of the electric charge amount corresponding to the gradation data GD [9:0] to the signal supply line. As a result, the voltage corresponding to the gradation data GD [9:0] is output to the signal supply line. Since this driving is not feedback-controlled, errors may be caused between the voltage output through the driving and the target voltage. The second driving circuit 70 can correct the error through a feedback-control.

4. Third Embodiment

In the third embodiment, the configuration and operation of the first driving circuit 60 are the same as in the first embodiment or the second embodiment. For the configuration and operation of the second driving circuit 70, differences from the first embodiment are mainly described below.

Figure 16:
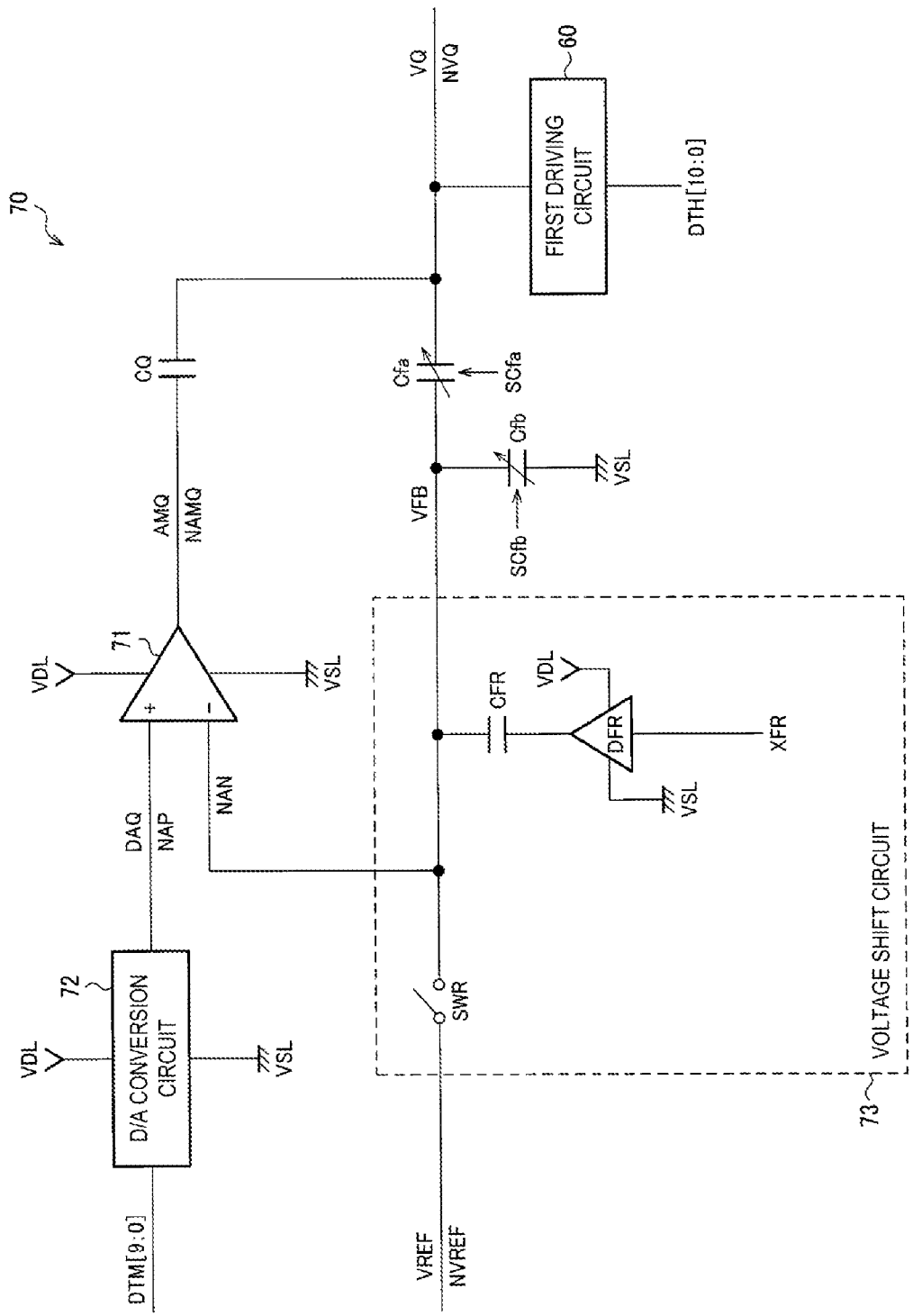
FIG. 16 illustrates a second specific configuration example of the second driving circuit.

FIG. 16 illustrates a second specific configuration example of the second driving circuit. The second driving circuit 70 includes the computation amplifier 71, the D/A conversion circuit 72, the output capacitor CQ, the first feedback capacitor Cfa, the second feedback capacitor Cfb, and a voltage shift circuit 73.

Figure 17:
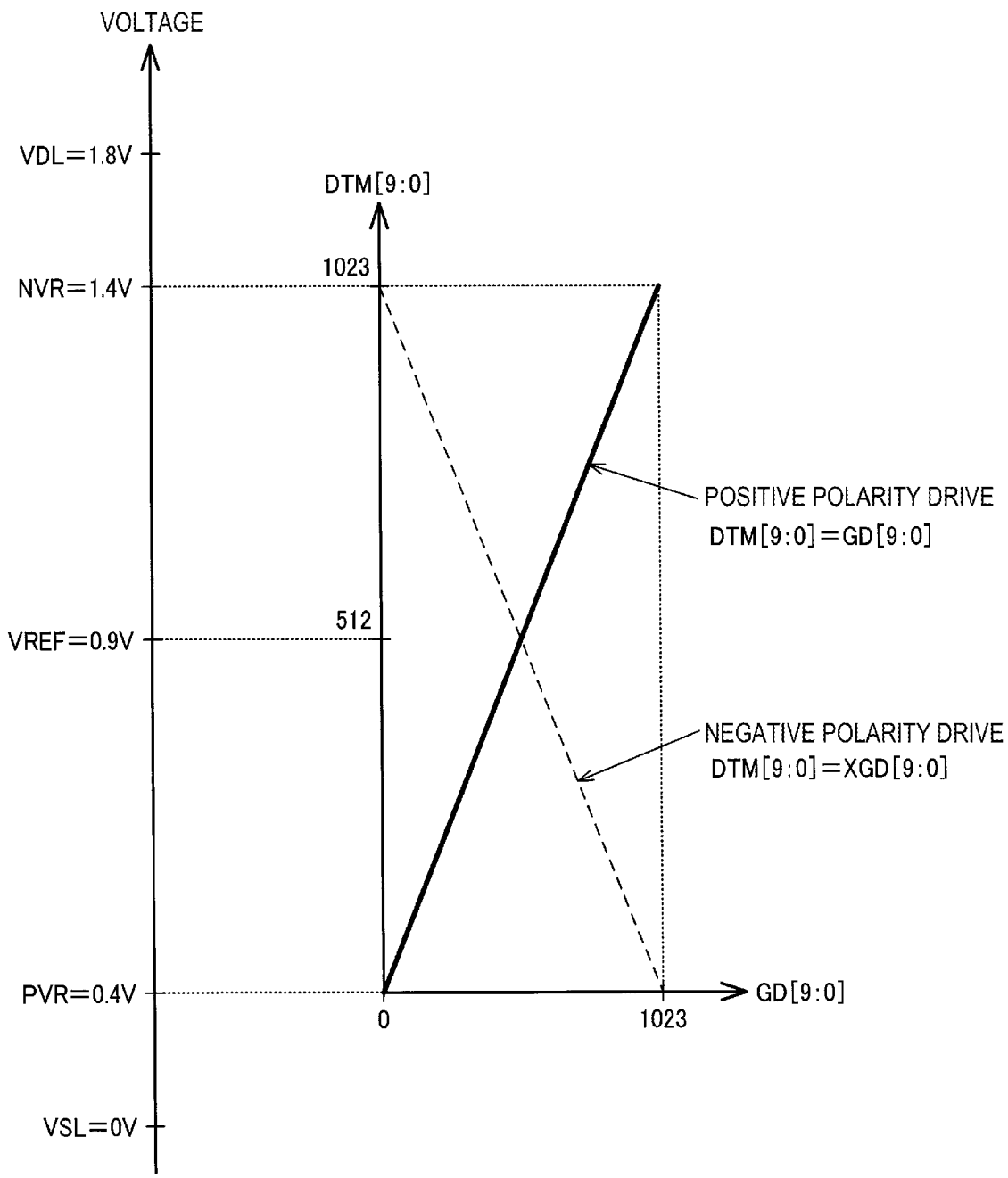
FIG. 17 illustrates a relationship between gradation data and a D/A conversion voltage.

The processing circuit 42 outputs gradation data DTM [9:0] on the basis of the gradation data GD [9:0]. The D/A conversion circuit 72 D/A-converts the gradation data DTM [9:0] into the D/A conversion voltage DAQ. FIG. 17 illustrates a relationship between gradation data and a D/A conversion voltage. The processing circuit 42 sets the DTM [9:0]=GD [9:0] in the positive polarity drive, and sets the DTM [9:0]=XGD [9:0] in the negative polarity drive. The D/A conversion circuit 72 outputs the DAQ=0.4 V to 1.4 V for the DTM [9:0]=0 to 1023.

The voltage shift circuit 73 includes the initialization switch SWR, a shifting capacitor CFR, and a voltage output circuit DFR.

One end of the shifting capacitor CFR is coupled to the inverting input node NAN of the computation amplifier 71. A signal XFR, which is a logic inversion signal of the polarity inversion signal FR, is input to the voltage output circuit DFR. The voltage output circuit DFR outputs a signal at a voltage level of VSL=0 V to the other end of the shifting capacitor CFR when the signal XFR is at the low level, and outputs a signal at a voltage level of VDL=1.8 V to the other end of the shifting capacitor CFR when the signal XFR is at the high level.

When the range of the output voltage VQ is 10 V, the feedback gain is set to 1/10 in the first embodiment, but it is set to 1/5 in the third embodiment. In this manner, in each of the positive polarity drive and the negative polarity drive, the range of the output voltage VQ is 5 V for the range 1 V of the D/A conversion voltage DAQ. In this case, since the division ratio of the Cfa and Cfb+CFR is 4:1, (Cfb+CFR)/Cfa=4 holds. When the range of the output voltage VQ is 5 V, the feedback gain is set to 1/5 in the first embodiment, but it is set to 1/2.5 in the third embodiment. In this case, since the division ratio of Cfa and Cfb+CFR is 1.5:1, (Cfb+CFR)/Cfa=1.5 holds.

In addition, the capacitance values of the CFR and Cfb are set such that the voltage VFB is changed by 0.5 V when the voltage of the other end of the shifting capacitor CFR is changed by 1.8 V. In this case, since the division ratio of the CFR and Cfb is 1.3:0.5, Cfb/CFR=1.3 V/0.5 V=2.6 holds.

Note that a level shifter may be provided at the preceding stage of the voltage output circuit DFR. The level shifter level-shifts the voltage level of the signal XFR to the level of the high-breakdown voltage power source voltages VSH and VDH. In this case, the voltage output circuit DFR is composed of a high-breakdown voltage transistor, and operates with the power source voltages VSH and VDH.

Figure 18:
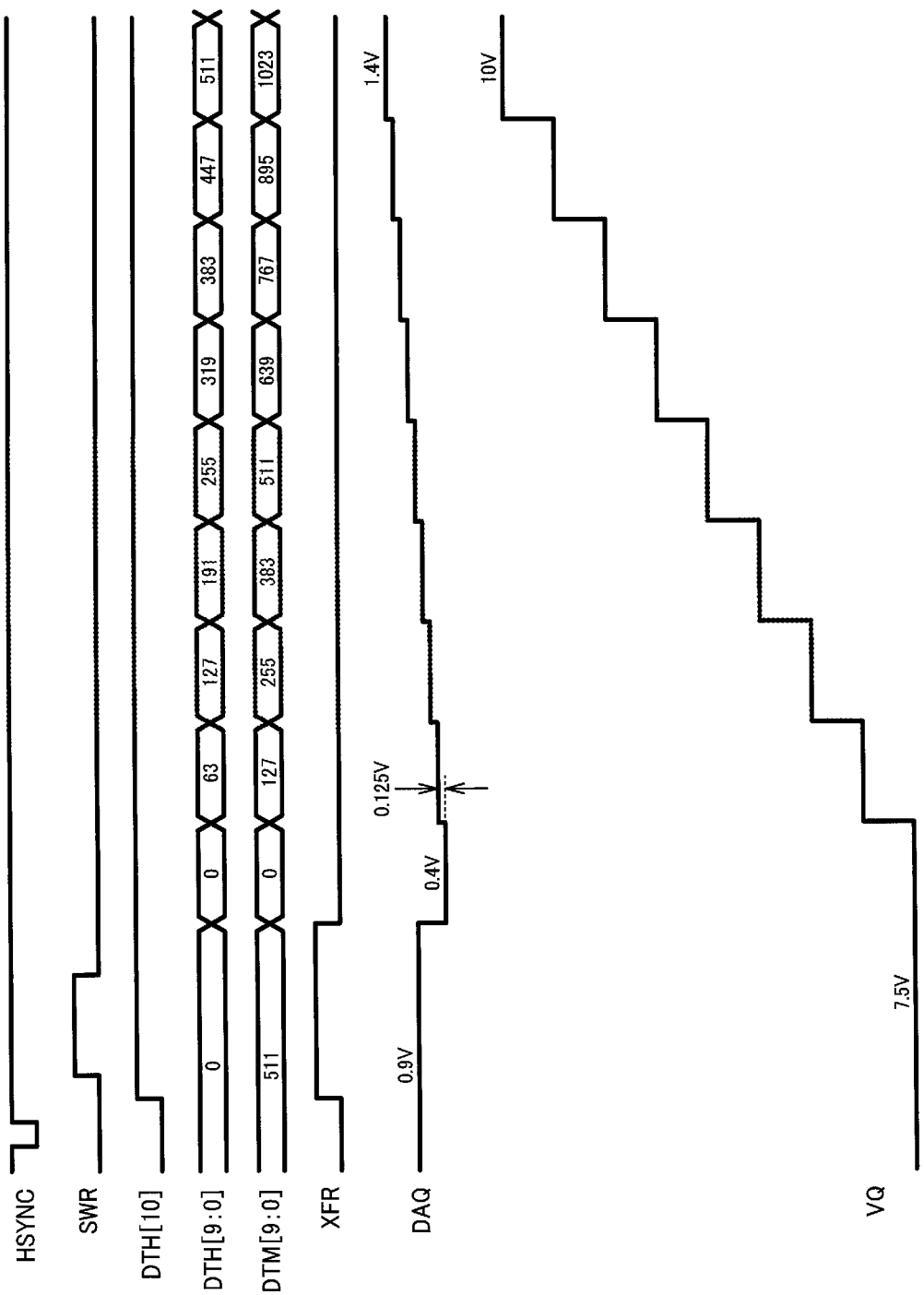
FIG. 18 illustrates a fifth waveform example for describing operations of the first driving circuit and the second driving circuit.

FIG. 18 illustrates a fifth waveform example for describing operations of the first driving circuit and the second driving circuit. FIG. 18 illustrates a waveform example when the feedback gain is set to 1/5 in the positive polarity drive period.

After the horizontal scanning period is started, the processing circuit 42 outputs the DTH [9:0]=0 and the DTM [9:0]=511, and sets the DTH [10] from 0 to 1. In this case, the D/A conversion voltage DAQ=0.9 V and the output voltage VQ=7.5 V are obtained.

Next, after the signal XFR is changed from the low level to the high level, the processing circuit 42 turns the initialization switch SWR from off to on, and from on to off. When the signal XFR is at the high level and the initialization switch SWR is on, the voltage VFB of the inverting input node NAN of the computation amplifier 71 is initialized to the reference voltage VREF=VCL=0.9 V. Next, the processing circuit 42 sets the signal XFR from the high level to the low level. In this manner, the voltage VFB of the inverting input node NAN of the computation amplifier 71 is shifted from 0.9 V to 0.4 V corresponding to the positive polarity initializing voltage. Note that in FIG. 18, the period until the signal XFR is set from the high level to the low level after the initialization switch SWR turns on from off corresponds to the initialization period.

Next, writing to the pixel is started. The processing circuit 42 sequentially outputs the DTM [9:0] of the gradation values 0, 127, . . . , 1023 and the DTH [9:0] of the gradation values 0, 63, . . . , 511. As a result, the D/A conversion voltage DAQ sequentially changes from 0.4 V to 1.4 V, and the output voltage VQ sequentially changes from 7.5 V to 10 V. Note that while the gradation value for which the voltage range is easy to understand is exemplified here, the gradation value written to each pixel may be arbitrary.

Figure 19:
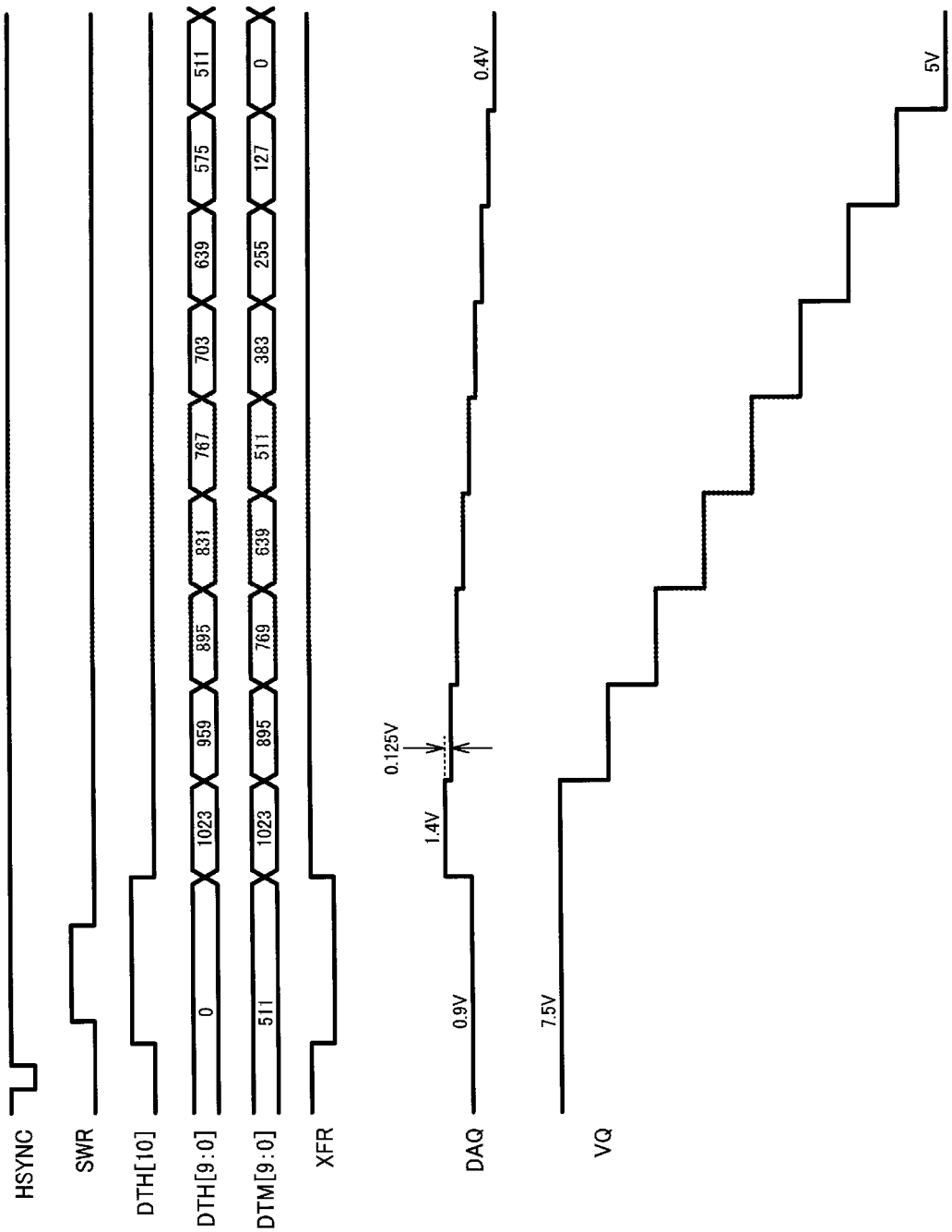
FIG. 19 illustrates a sixth waveform example for describing operations of the first driving circuit and the second driving circuit.

FIG. 19 illustrates a sixth waveform example for describing operations of the first driving circuit and the second driving circuit. FIG. 18 illustrates a waveform example when the feedback gain is set to 1/5 in the horizontal scanning period of the negative polarity drive period.

After the horizontal scanning period is started, the processing circuit 42 outputs the DTH [9:0]=0 and the DTM [9:0]=511, and sets the DTH [10] from 0 to 1. In this case, the D/A conversion voltage DAQ=0.9 V and the output voltage VQ=7.5 V are obtained.

Next, after setting the signal XFR from the high level to the low level, the processing circuit 42 turns the initialization switch SWR from off to on, and from on to off. When the signal XFR is at the low level and the initialization switch SWR is on, the voltage VFB of the inverting input node NAN of the computation amplifier 71 is initialized to the reference voltage VREF=VCL=0.9 V. Next, the processing circuit 42 sets the signal XFR from the low level to the high level. As a result, the voltage VFB of the inverting input node NAN of the computation amplifier 71 is shifted from 0.9 V to 1.4 V corresponding to the negative polarity initializing voltage.

Next, writing to the pixel is started. After setting the DTH [10] from 1 to 0, the processing circuit 42 sequentially outputs the DTM [9:0] of the gradation values 1023, 895, . . . , 0 and the DTH [9:0] of the gradation values 1023, 959, . . . , 511. As a result, the D/A conversion voltage DAQ sequentially changes from 1.4 V to 0.4 V, and the output voltage VQ sequentially changes from 7.5 V to 5 V. Note that while the gradation value for which the voltage range is easy to understand is exemplified here, the gradation value written to each pixel may be arbitrary.

Figure 20:
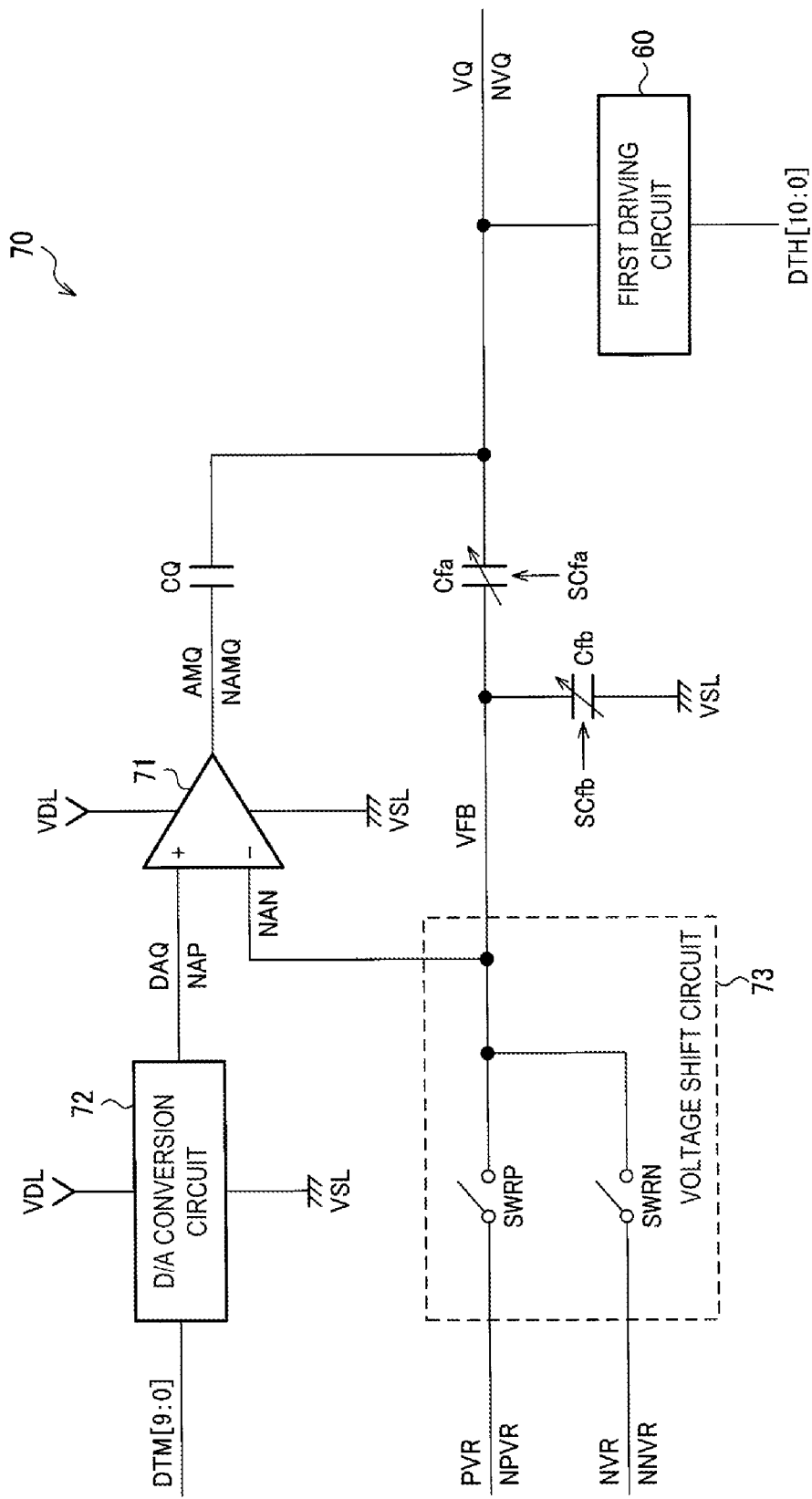
FIG. 20 illustrates a third specific configuration example of the second driving circuit.

FIG. 20 illustrates a third specific configuration example of the second driving circuit. In this configuration example, the voltage shift circuit 73 includes a first initialization switch SWRP and a second initialization switch SWRN.

One end of the first initialization switch SWRP is coupled to the inverting input node NAN of the computation amplifier 71, and the other end is coupled to a node NPVR to which a positive polarity initializing voltage PVR is supplied. One end of the second initialization switch SWRN is coupled to the inverting input node NAN of the computation amplifier 71, and the other end is coupled to a node NNVR to which a negative polarity initializing voltage NVR is supplied. The initialization voltages PVR and NVR are supplied to the nodes NPVR and NNVR from a voltage generation circuit not illustrated in the drawing included in the driver 100, for example.

The processing circuit 42 controls the first initialization switch SWRP and the second initialization switch SWRN on or off on the basis of the polarity inversion signal. More specifically, the first initialization switch SWRP turns on in the initialization period of the positive polarity drive period, and the inverting input node NAN of the computation amplifier 71 is initialized to the initialization voltage PVR=0.4 V. The second initialization switch SWRN turns on in the initialization period of the negative polarity drive period, and the inverting input node NAN of the computation amplifier 71 is initialized to the initialization voltage NVR=1.4 V.

In the above-mentioned embodiment, the driver 100 includes the voltage shift circuit 73. The voltage shift circuit 73 is electrically coupled to the inverting input node NAN of the computation amplifier 71, and shifts the voltage VFB of the inverting input node NAN.

According to this embodiment, the voltage shift circuit 73 shifts the voltage VFB of the inverting input node NAN, and thus the reference of the voltage VFB of the inverting input node NAN is shifted. By dividing the range of the output voltage VQ into a plurality of ranges and shifting the reference of the voltage VFB for each range, each range of the output voltage VQ and the range of the D/A conversion voltage DAQ can be associated with each other. In this manner, the number of gradations of the D/A conversion can be reduced while reducing the gain (Cfa+Cfb)/Cfa of the second driving circuit 70.

In addition, in this embodiment, the voltage shift circuit 73 sets, to the inverting input node NAN of the computation amplifier 71, initialization voltages that are different between the initialization period of the positive polarity drive period and the initialization period of the negative polarity drive period on the basis of the polarity inversion signal FR.

For example, in FIG. 16, the shifting capacitor CFR and the voltage output circuit DFR set the initialization voltage on the basis of the polarity inversion signal. Alternatively, in FIG. 20, the first initialization switch SWRP and the second initialization switch SWRN set the initialization voltage on the basis of the polarity inversion signal.

According to this embodiment, the range 0.4 V to 1.4 V of the D/A conversion voltage DAQ and the range 7.5 V to 12.5 V of the output voltage VQ in the positive polarity drive period are associated with each other, and the range 1.4 V to 0.4 V of the D/A conversion voltage DAQ and the range 7.5 V to 2.5 V of the output voltage VQ in the negative polarity drive period are associated with each other. In this manner, the gain (Cfa+Cfb)/Cfa of the second driving circuit 70 can be set to about ½, and the number of gradations of the D/A conversion can be reduced from 2048 to ½, i.e., 1024.

5. Fourth Embodiment

In the fourth embodiment, the configuration and operation of the first driving circuit 60 are the same as in the first embodiment or the second embodiment. For the configuration and operation of the second driving circuit 70, differences from the first embodiment are mainly described below.

Figure 21:
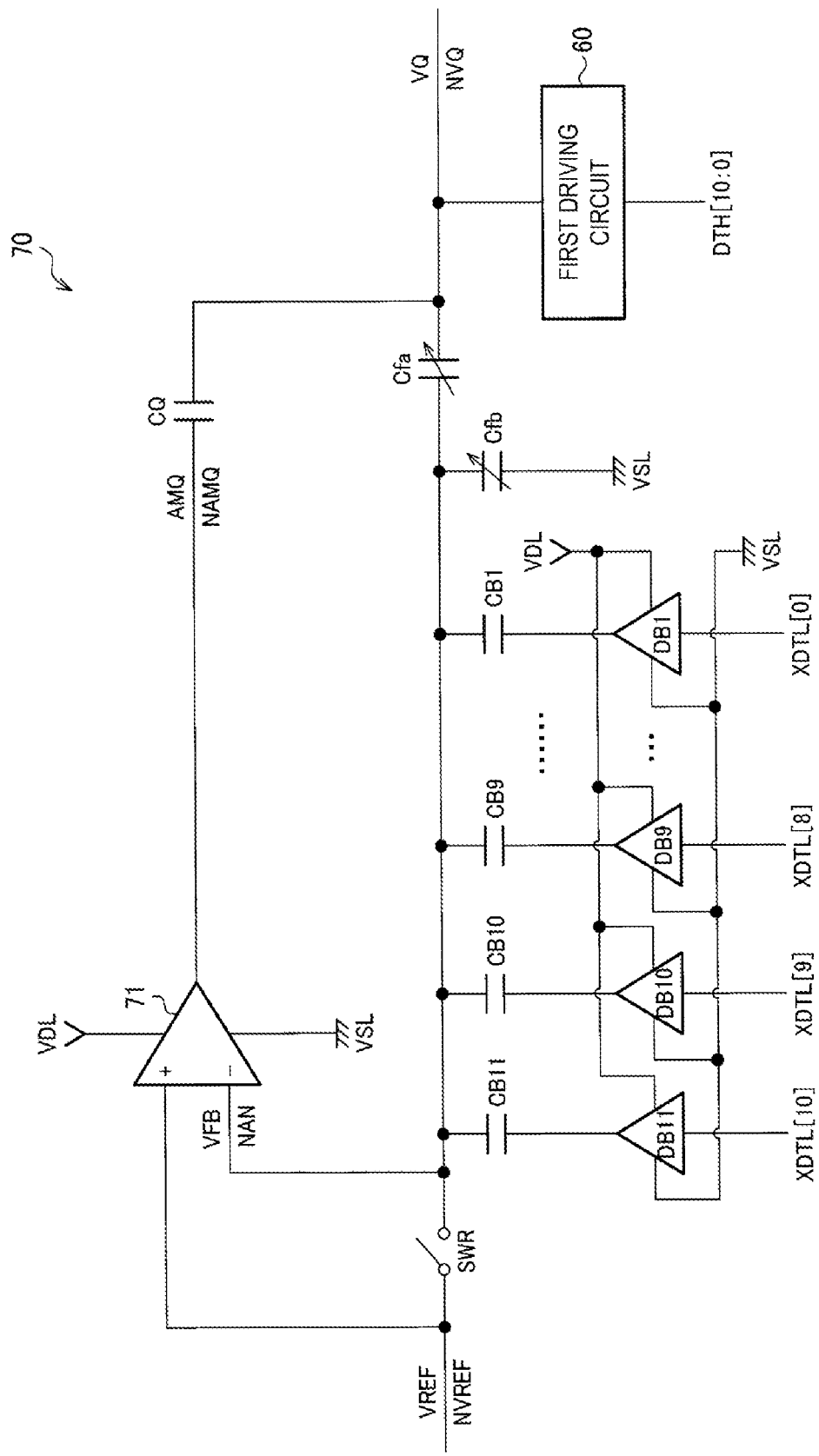
FIG. 21 illustrates a fourth specific configuration example of the second driving circuit.

FIG. 21 illustrates a fourth specific configuration example of the second driving circuit. The second driving circuit 70 includes the computation amplifier 71, the output capacitor CQ, the first feedback capacitor Cfa, the second feedback capacitor Cfb, the initialization switch SWR, first to m+1-th voltage outputting capacitors CB1 to CBm+1 and first to m+1-th voltage output circuits DB1 to DBm+1. Note that while an example of m=10 is described here, it suffices that m is an integer of 2 or more. In the fourth embodiment, it suffices that m+1 is set to the same number as the number of bits of the gradation data DTL [10:0].

One end of the voltage outputting capacitor CBp is coupled to the inverting input node NAN of the computation amplifier 71, and the other end is coupled to the output of the voltage output circuit DBp. The p is an integer of 1 or more and m+1=11 or smaller. The voltage outputting capacitors CB1 to CB11 have capacitance values weighted in a binary manner. More specifically, the capacitance value of the voltage outputting capacitor CBp is 2(p−1)×CB1.

The voltage output circuit DBp outputs the first voltage level when the bit signal XDTL [p−1], which is a logic inversion signal of the bit signal DTL [p−1], is at the first logic level, whereas the voltage output circuit DBp outputs the second voltage level when the bit signal XDTL [p−1] is at the second logic level. For example, the first logic level is "0", the second logic level is "1", the first voltage level is the low-potential side power source voltage VSH, and the second voltage level is the high-potential side power source voltage VDH. The voltage output circuit DBp is composed of a low-breakdown voltage process transistor, and operates with the power source voltages VDL and VSL. The voltage output circuit DBp is a buffer circuit that buffers and outputs the input signal.

One end of the initialization switch SWR is coupled to the inverting input node NAN of the computation amplifier 71, and the other end is coupled to a node NVREF to which a reference voltage VREF is supplied. The non-inverting input node of the computation amplifier 71 is coupled to the node NVREF to which the reference voltage VREF is supplied.

The initialization switch SWR is off during pixel drive. In this case, the computation amplifier 71 performs the feedback-control such that the voltage VFB of the inverting input node NAN of the computation amplifier 71 is set to the reference voltage VREF=0.9 V by virtual short. As a result, the bit signals XDTL [10] to XDTL [0] are set to 0 or 1 in accordance with the gradation data DTL [10:0], and thus the data voltage corresponding to the gradation data DTL [10:0] is output to the output node NVQ.

The capacitance value of each capacitor is described below. The total capacitance of the CB1 to CB11 will be denoted as CB=CB1+CB2+ . . . +CB11.

For example, the feedback gain is set to 1/10, and the gain of the second driving circuit 70 is set to 10. In this case, the range of the output voltage VQ is 10 V. When all of the XDTL [10] to XDTL [0] are changed from 1 to 0, i.e., when all output voltages of the voltage output circuits DB1 to DB11 are changed from VDL=1.8 V to VSL=0 V, it suffices that the output voltage VQ is changed by 10 V, and therefore CB/Cfa=10 V/1.8 V=50/9 holds.

On the other hand, Vfa represents the voltage change fed back to the inverting input node NAN of the computation amplifier 71 through the first feedback capacitor Cfa when the first driving circuit 60 changes the voltage of the output node NVQ by 10 V. Here, Vfa=1 V is set while it suffices that Vfa 1.8 V holds. In this case, it suffices that 10 V is divided in 9:1 by with the Cfa and Cfb+CB, therefore (Cfb+CB)/Cfa=9 holds.

In addition, for example, the feedback gain is set to 1/5, and the gain of the second driving circuit 70 is set to 5. In this case, the range of the output voltage VQ is 5 V. When all of the XDTL [10] to XDTL [0] are changed from 1 to 0, i.e., when all output voltages of the voltage output circuits DB1 to DB11 are changed from VDL=1.8 V to VSL=0 V, it suffices that the output voltage VQ is changed by 5 V, and therefore CB/Cfa=5 V/1.8 V=25/9 holds.

On the other hand, Vfa=1 V is set as the voltage change fed back to the inverting input node NAN of the computation amplifier 71 through the first feedback capacitor Cfa when the first driving circuit 60 changes the voltage of the output node NVQ by 5 V. In this case, since it suffices that 10 V is divided in 4:1 by the Cfa and Cfb+CB, (Cfb+CB)/Cfa=4 holds.

Note that since the voltage change of the inverting input node NAN due to the change of the XDTL [10] to XDTL [0] is 1.8 V at maximum, it suffices that Vfa≤1.8 V holds. When Vfa≤1.8 V holds, the voltage change of the inverting input node NAN due to the change of the XDTL [10] to XDTL [0] and the voltage change of the inverting input node NAN when the first driving circuit 60 changes the voltage of the output node NVQ can be balanced. That is, the voltage of the inverting input node NAN is maintained at VFB=0.9 V as long as the voltage changes are ideally balanced even when the computation amplifier 71 does not output the charge, and it suffices that only when there is an error in the balance, the computation amplifier 71 outputs the charge corresponding to that error.

The capacitance value of the output capacitor CQ may be arbitrary as long as an output voltage AMQ of the computation amplifier 71 is set within the range of VSL to VDL. For example, the capacitance value of the output capacitor CQ is set to about 1 to 10 times the sum of the capacitor circuit 10, the variable capacitance circuit 30 and the electrooptic panel side capacitance CP. As an example, in the case where the capacitance value of the output capacitor CQ is four times the above-mentioned sum, an error of 0.1 V of the output voltage VQ can be compensated by changing the output voltage AMQ of the computation amplifier 71 by 0.1 V×(5/4)=0.125 V.

In the above-mentioned embodiment, the driver 100 includes the first driving circuit 60 and the second driving circuit 70. The first driving circuit 60 supplies a data signal to the signal supply line of the electrooptic panel 200 on the basis of the gradation data. The second driving circuit 70 includes the computation amplifier 71, the output capacitor CQ, the first feedback capacitor Cfa, first to m-th voltage outputting capacitors CB1 to CBm, and first to m-th voltage output circuits DB1 to DBm. One end of the output capacitor CQ is electrically coupled to the output node NAMQ of the computation amplifier 71, and the other end is electrically coupled to signal supply line. One end of the first feedback capacitor Cfa is electrically coupled to the inverting input node NAN of the computation amplifier 71, and the other end is electrically coupled to the signal supply line. The first feedback capacitor Cfa is a capacitor with a variable capacitance value. One ends of the first to m-th voltage outputting capacitors CB1 to CBm are electrically coupled to the inverting input node NAN of the computation amplifier 71. The first to m-th voltage output circuits DB1 to DBm output the voltage based on the gradation data to the other ends of the first to m-th voltage outputting capacitors CB1 to CBm, and the first to m-th voltage output circuits DB1 to DBm output the voltage based on the gradation data to the other ends of the first to m-th voltage outputting capacitors CB1 to CBm. The second driving circuit 70 is electrically coupled to the signal supply line.

According to this embodiment, since the capacitance value of the first feedback capacitor Cfa is variable, the feedback gain from the signal supply line to the inverting input node NAN of the computation amplifier 71, and the gain of the second driving circuit 70 can be varied. In this manner, the voltage range of the data voltage output to the signal supply line can be changed without changing the voltage step of one gradation and the number of gradations of the second driving circuit 70. It is necessary to change the range of the voltage applied to the pixel depending on the color of the light incident on the electrooptic panel 200 as described above, but according to this embodiment, the range of the voltage applied to the pixel can be changed while maintaining the number of gradations and the voltage step of one gradation.

In addition, in this embodiment, the computation amplifier 71 is composed of a transistor with a breakdown voltage lower than the breakdown voltage of the transistor making up the first driving circuit 60.

According to this embodiment, the output node NAMQ of the computation amplifier 71 and the signal supply line are coupled by the output capacitor CQ, and the inverting input node NAN of the computation amplifier 71 and the signal supply line are coupled by the first feedback capacitor Cfa. In this manner, the computation amplifier 71 and the signal supply line are DC disconnected, and thus the computation amplifier 71 can be composed of a transistor with a breakdown voltage lower than the breakdown voltage of the transistor making up the first driving circuit 60.

6. Electronic Apparatus

Figure 22:
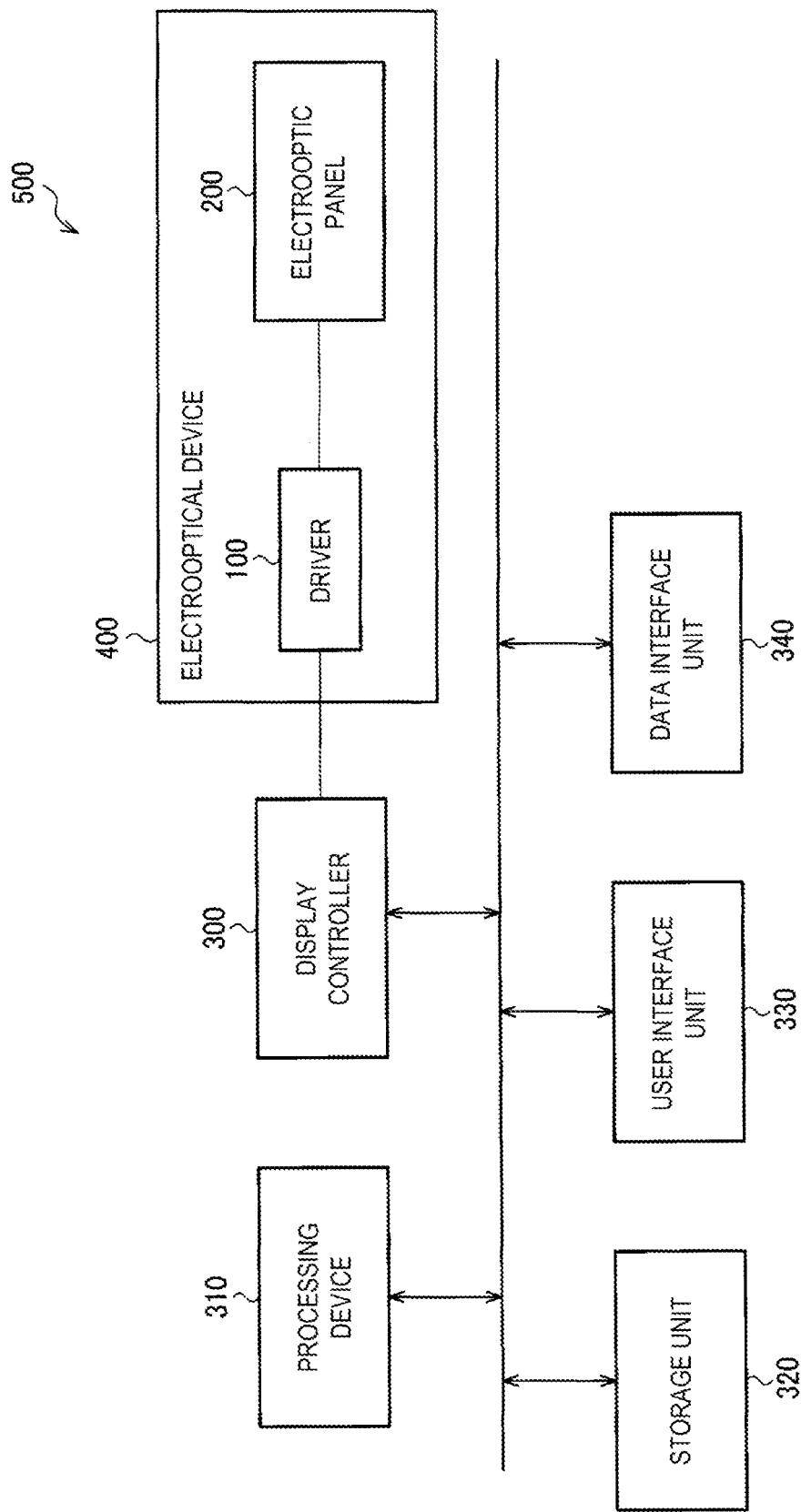
FIG. 22 illustrates a configuration example of an electronic apparatus.

FIG. 22 illustrates a configuration example of an electronic apparatus including the driver of the embodiment. The electronic apparatus of the embodiment may be various electronic apparatuses equipped with a display device. For example, the electronic apparatus is a projector, a television device, an information processing device, a mobile information terminal, a car navigation system, a mobile game terminal, or the like.

An electronic apparatus 500 includes the electrooptical device 400, the display controller 300, a processing device 310, a storage unit 320, a user interface unit 330, and a data interface unit 340. An electrooptical device 400 includes a driver 100 and an electrooptic panel 200.

The electrooptic panel 200 is a matrix-type liquid crystal display panel, for example. Alternatively, the electrooptic panel 200 may be an EL display panel using a self-luminous element. EL is an abbreviation of Electro-Luminescence. The user interface unit 330 is an interface unit that receives various operations from the user. For example, it is composed of a button, a mouse, a keyboard, a touch panel equipped in the electrooptic panel 200 and the like. The data interface unit 340 is an interface unit for inputting and outputting image data or control data. For example, it is a wired communication interface of USB or the like, or a radio communication interface of wireless LAN or the like. The storage unit 320 stores the image data input from the data interface unit 340. Alternatively, the storage unit 320 functions as a working memory of the processing device 310 or the display controller 300. The processing device 310 performs the control process of each unit of the electronic apparatus and various data processes. The processing device 310 is a processor such as a microcomputer or a CPU. The display controller 300 performs the control process of the driver 100. For example, the display controller 300 converts image data transferred from the data interface unit 340 or the storage unit 320 into a format that can be received by the driver 100, and outputs the converted image data to the driver 100. The driver 100 drives the electrooptic panel 200 on the basis of the image data transferred from the display controller 300.

A driver of the above-described embodiment includes a first driving circuit and a second driving circuit. The first driving circuit supplies a data signal to a signal supply line of an electrooptic panel based on gradation data. The second driving circuit includes a computation amplifier. The second driving circuit includes an output capacitor including one end electrically coupled to an output node of the computation amplifier and the other end electrically coupled to the signal supply line. The second driving circuit includes a first feedback capacitor including one end electrically coupled to an inverting input node of the computation amplifier and the other end electrically coupled to the signal supply line. The second driving circuit includes a second feedback capacitor including one end electrically coupled to the inverting input node of the computation amplifier and the other end electrically coupled to a predetermined potential node. The second driving circuit is electrically coupled to the signal supply line. At least one of the first feedback capacitor and the second feedback capacitor is a capacitor with a variable capacitance value.

According to this embodiment, since the capacitance value of at least one of the first feedback capacitor and the second feedback capacitor is variable, the feedback gain from the signal supply line to the inverting input node of the computation amplifier and the gain of the second driving circuit can be varied. In this manner, the voltage range of the data voltage output to the signal supply line can be changed without changing the voltage step of one gradation and the number of gradations of the second driving circuit. It is necessary to change the range of the voltage applied to the pixel depending on the color of light incident on the electrooptic panel and the like, but according to this embodiment, the range of the voltage applied to the pixel can be changed while maintaining the number of gradations and the voltage step of one gradation.

In addition, in this embodiment, the second driving circuit may include a D/A conversion circuit configured to supply a D/A conversion voltage based on the gradation data to the inverting input node of the computation amplifier.

According to this embodiment, when there is a difference between the D/A conversion voltage and the voltage fed back from the signal supply line to the inverting input node of the computation amplifier, the computation amplifier supplies a charge to the signal supply line through the output capacitor, and thus the difference between the voltage of the signal supply line and the target voltage corresponding to the gradation data can be corrected. In this manner, even in the case where there is an error between the voltage output by the first driving circuit to the signal supply line and the target voltage, the error can be corrected by the second driving circuit.

In addition, in this embodiment, the computation amplifier may be made up of a transistor with a breakdown voltage lower than a breakdown voltage of a transistor making up the first driving circuit.

According to this embodiment, the output node of the computation amplifier and the signal supply line are coupled by the output capacitor, and the inverting input node of the computation amplifier and the signal supply line are coupled by the first feedback capacitor. In this manner, the computation amplifier and the signal supply line are DC disconnected, and thus the computation amplifier can be composed of a transistor with a breakdown voltage lower than the breakdown voltage of the transistor making up the first driving circuit.

In addition, in this embodiment, a length of a distance between a source and a drain of the transistor making up the first driving circuit may be greater than a length of a distance between a source and a drain of a transistor making up the second driving circuit. Alternatively, a film thickness of a gate insulating film of the transistor making up the first driving circuit may be greater than a film thickness of a gate insulating film of the transistor making up the second driving circuit.

According to this embodiment, the transistor making up the second driving circuit including the computation amplifier can be composed of a transistor with a breakdown voltage lower than the breakdown voltage of the transistor making up the first driving circuit.

In addition, in this embodiment, a capacitance of the second feedback capacitor may be greater than a capacitance of the first feedback capacitor.

According to this embodiment, the gain of the second driving circuit is greater than 2, and therefore the voltage range applied to the computation amplifier is smaller than ½ of the voltage range of the signal supply line. In this manner, the computation amplifier can be composed of a transistor with a breakdown voltage lower than the breakdown voltage of the transistor making up the first driving circuit.

In addition, in this embodiment, the driver may further include a processing circuit configured to output second gradation data obtained by multiplying the gradation data by a gain corresponding to the variable capacitance value. The first driving circuit may be configured to supply the data signal to the signal supply line based on the second gradation data.

According to this embodiment, the first driving circuit outputs the data voltage on the basis of the second gradation data obtained by multiplying the gradation data by the gain corresponding to the variable capacitance value, and thus its voltage range changes in accordance with the gain. By canceling the feedback gain and the gain for changing the voltage range, the voltage range fed back to the inverting input node of the computation amplifier can be made constant. In this manner, the voltage range of the data voltage output to the signal supply line can be changed without changing the voltage step of one gradation and the number of gradations of the second driving circuit.

In addition, in this embodiment, the first feedback capacitor may include a first switch group and a first capacitor group in which a plurality of pairs of a switch and a capacitor disposed in series between the signal supply line and the inverting input node of the computation amplifier are disposed in parallel to each other. The second feedback capacitor may include a second switch group and a second capacitor group in which a plurality of pairs of a switch and a capacitor disposed in series between the inverting input node of the computation amplifier and the predetermined potential node are disposed in parallel to each other.

According to this embodiment, when each switch of the first switch group is turned on or off, the capacitor coupled in series with the switch that is on in the first capacitor group is coupled between the signal supply line and the inverting input node of the computation amplifier. In this manner, the capacitance value of the first feedback capacitor is controlled in a variable manner. Likewise, when each switch of the second switch group is turned on or off, the capacitance value of the second feedback capacitor is controlled in a variable manner.

In addition, in this embodiment, the driver may further include an initialization switch configured to be on in an initialization period, and supply a reference voltage to the inverting input node of the computation amplifier.

According to this embodiment, the inverting input node of the computation amplifier changes with respect to the reference voltage. When the range of D/A conversion voltage is represented by (reference voltage−ΔV1) to (reference voltage+ΔV2), it suffices to set the reference voltage such that (reference voltage−ΔV1) is higher than the low-potential side power source voltage of the second driving circuit, and that (reference voltage+ΔV2) is lower than the high-potential side power source voltage of the second driving circuit.

In addition, in this embodiment, the first driving circuit may include a capacitor driving circuit configured to output first to n-th capacitor drive voltages corresponding to the gradation data to first to n-th capacitor driving nodes, and a capacitor circuit including first to n-th capacitors disposed between the signal supply line and the first to n-th capacitor driving nodes. Here, n is an integer of 2 or more According to this embodiment, the capacitor driving circuit outputs the first to n-th capacitor drive voltages corresponding to the gradation data and thus the first to n-th capacitors output the charge of the electric charge amount corresponding to the gradation data to the signal supply line. As a result, the voltage corresponding to the gradation data is output to the signal supply line. Since this driving is not feedback-controlled, errors may be caused between the voltage output through the driving and the target voltage. This error can be corrected by the second driving circuit through a feedback-control.

In addition, in this embodiment, the driver may further include a control circuit configured to control the first driving circuit. The first driving circuit may include a first driving transistor group disposed between the signal supply line and a node to which a high-potential side power source voltage is supplied, and a second driving transistor group disposed between the signal supply line and a node to which a low-potential side power source voltage is supplied. The control circuit may perform on-off control of each transistor of the first driving transistor group or each transistor of the second driving transistor group based on the gradation data.

According to this embodiment, the transistor of the first driving transistor group or the second driving transistor group that is turned on based on the gradation data outputs the charge of the electric charge amount corresponding to the gradation data to the signal supply line. As a result, the voltage corresponding to the gradation data is output to the signal supply line. Since this driving is not feedback-controlled, errors may be caused between the voltage output through the driving and the target voltage. This error can be corrected by the second driving circuit through a feedback-control.

In addition, in this embodiment, the driver may further include a voltage shift circuit electrically coupled to the inverting input node of the computation amplifier and configured to shift a voltage of the inverting input node.

According to this embodiment, the voltage shift circuit shifts the voltage of the inverting input node of the computation amplifier, and thus the reference of the voltage of the inverting input node is shifted. By dividing the range of the voltage output to the signal supply line into a plurality of ranges and shifting the reference of the voltage of the inverting input node for each range, each range of the voltage output to the signal supply line and the range of the D/A conversion voltage can be associated with each other. In this manner, the gain of the second driving circuit can be reduced, and the number of gradations of the D/A conversion can be reduced.

In addition, in this embodiment, based on a polarity inversion signal, the voltage shift circuit may set an initialization voltage for the inverting input node of the computation amplifier, the initialization voltage in an initialization period of a positive polarity drive period being different from that in an initialization period of a negative polarity drive period.

According to this embodiment, the range of the voltage output to the signal supply line in the positive polarity drive period and the range of the D/A conversion voltage are associated with each other, and the range of the voltage output to the signal supply line in the negative polarity drive period and the range of the D/A conversion voltage are associated with each other. In this manner, the gain of the second driving circuit 70 can be set to about ½, and the number of gradations of the D/A conversion can be reduced to ½.

A driver of the embodiment includes a first driving circuit and a second driving circuit. The first driving circuit supplies a data signal to a signal supply line of an electrooptic panel based on gradation data. The second driving circuit includes a computation amplifier. The second driving circuit includes an output capacitor including one end electrically coupled to an output node of the computation amplifier and the other end electrically coupled to the signal supply line. The second driving circuit includes the first feedback capacitor that is a capacitor with a variable capacitance value including one end electrically coupled to an inverting input node of the computation amplifier and the other end electrically coupled to the signal supply line. The second driving circuit includes first to m-th voltage outputting capacitors including one end electrically coupled to the inverting input node of the computation amplifier. The m is an integer of 2 or more. The second driving circuit includes the first to m-th voltage output circuits configured to output a voltage based on the gradation data to the other end of the first to m-th voltage outputting capacitors The second driving circuit is electrically coupled to the signal supply line.

According to this embodiment, since the capacitance value of the first feedback capacitor is variable, the feedback gain from the signal supply line to the inverting input node of the computation amplifier and the second driving circuit gain can be variable. In this manner, the voltage range of the data voltage output to the signal supply line can be changed without changing the voltage step of one gradation and the number of gradations of the second driving circuit. As described above, it is necessary to change the range of the voltage applied to the pixel depending on the color of light incident on the electrooptic panel and the like, but according to this embodiment, the range of the voltage applied to the pixel can be changed while maintaining the number of gradations and the voltage step of one gradation.

In addition, in this embodiment, the computation amplifier may be made up of a transistor with a breakdown voltage lower than a breakdown voltage of a transistor making up the first driving circuit.

According to this embodiment, the output node of the computation amplifier and the signal supply line are coupled by the output capacitor, and the inverting input node of the computation amplifier and the signal supply line are coupled by the first feedback capacitor. In this manner, the computation amplifier and the signal supply line are DC disconnected, and thus the computation amplifier can be composed of a transistor with a breakdown voltage lower than the breakdown voltage of the transistor making up the first driving circuit.

In addition, an electrooptical device of this embodiment includes any of the above-described drivers and an electrooptic panel.

In addition, an electronic apparatus of this embodiment includes any of the above-described drivers.

Although the embodiment has been described in detail above, it will be readily understood by those skilled in the art that many variations are possible that do not materially depart from the novel matters and effects of the present disclosure. Accordingly, all such variations shall be included within the scope of this disclosure. For example, a term that is mentioned at least once in the specification or drawings together with a different term that is broader or synonymous may be replaced by that different term at any point in the specification or drawings. All combinations of the embodiments and variations are also included within the scope of this disclosure. In addition, the configurations, operations, and the like of the control circuit, the data line driving circuit, the driver, the electrooptic panel, the electrooptical device, the electronic apparatus and the like are not limited to the embodiment, and various variations may be made.

What is claimed is:

1. A driver comprising:
   a first driving circuit configured to supply a data signal to a signal supply line of an electro-optic panel based on gradation data; and
   a second driving circuit including a computation amplifier, an output capacitor, a first feedback capacitor, and a second feedback capacitor, and electrically coupled to the signal supply line, the output capacitor including one end electrically coupled to an output node of the computation amplifier and the other end electrically coupled to the signal supply line, the first feedback capacitor including one end electrically coupled to an inverting input node of the computation amplifier and the other end electrically coupled to the signal supply line, the second feedback capacitor including one end electrically coupled to the inverting input node of the computation amplifier and the other end electrically coupled to a predetermined potential node, wherein
   at least one of the first feedback capacitor and the second feedback capacitor is a capacitor with a variable capacitance value.

2. The driver according to claim 1, wherein
the second driving circuit includes a D/A conversion circuit configured to supply a D/A conversion voltage based on the gradation data to the inverting input node of the computation amplifier.

3. The driver according to claim 1, wherein
the computation amplifier is made up of a transistor with a breakdown voltage lower than a breakdown voltage of a transistor making up the first driving circuit.

4. The driver according to claim 3, wherein
a distance between a source and a drain of the transistor making up the first driving circuit is greater than a distance between a source and a drain of a transistor making up the second driving circuit, or a film thickness of a gate insulating film of the transistor making up the first driving circuit is greater than a film thickness of a gate insulating film of the transistor making up the second driving circuit.

5. The driver according to claim 1, wherein
a capacitance value of the second feedback capacitor is greater than a capacitance value of the first feedback capacitor.

6. The driver according to claim 1, further comprising
a processing circuit configured to output second gradation data obtained by multiplying the gradation data by a gain corresponding to the variable capacitance value, wherein
the first driving circuit is configured to supply the data signal to the signal supply line based on the second gradation data.

7. The driver according to claim 1, wherein
the first feedback capacitor includes a first switch group and a first capacitor group in which a plurality of pairs of a switch and a capacitor disposed in series between the signal supply line and the inverting input node of the computation amplifier are disposed in parallel to each other, and
the second feedback capacitor includes a second switch group and a second capacitor group in which a plurality of pairs of a switch and a capacitor disposed in series between the inverting input node of the computation amplifier and the predetermined potential node are disposed in parallel to each other.

8. The driver according to claim 1, further comprising
an initialization switch configured to be on in an initialization period, and supply a reference voltage to the inverting input node of the computation amplifier.

9. The driver according to claim 1, wherein
the first driving circuit includes:
a capacitor driving circuit configured to output first to n-th capacitor drive voltages corresponding to the gradation data to first to n-th capacitor driving nodes, n being an integer of 2 or more, and
a capacitor circuit including first to n-th capacitors disposed between the signal supply line and the first to n-th capacitor driving nodes.

10. The driver according to claim 1, further comprising
a control circuit configured to control the first driving circuit, wherein the first driving circuit includes:

a first driving transistor group disposed between the signal supply line and a node to which a high-potential side power source voltage is supplied, and a second driving transistor group disposed between the signal supply line and a node to which a low-potential side power source voltage is supplied, and the control circuit performs on-off control of each transistor of the first driving transistor group or each transistor of the second driving transistor group based on the gradation data.

11. The driver according to claim 1, further comprising a voltage shift circuit electrically coupled to the inverting input node of the computation amplifier and configured to shift a voltage of the inverting input node.

12. The driver according to claim 11, wherein the voltage shift circuit sets an initialization voltage for the inverting input node of the computation amplifier based on a polarity inversion signal, the initialization voltage in an initialization period of a positive polarity drive period being different from that in an initialization period of a negative polarity drive period.

13. An electro-optical device comprising:

the driver according to claim 1; and the electro-optic panel.

14. An electronic apparatus comprising:

the driver according to claim 1.

15. A driver comprising:

a first driving circuit configured to supply a data signal to a signal supply line of an electro-optic panel based on gradation data; and a second driving circuit including a computation amplifier, an output capacitor, a first feedback capacitor, first to m-th voltage outputting capacitors, and first to m-th voltage output circuits, and electrically coupled to the signal supply line, the output capacitor including one end electrically coupled to an output node of the computation amplifier, and the other end electrically coupled to the signal supply line, the first feedback capacitor being a capacitor with a variable capacitance value including one end electrically coupled to an inverting input node of the computation amplifier and the other end electrically coupled to the signal supply line, the first to m-th voltage outputting capacitors including one end electrically coupled to the inverting input node of the computation amplifier, the first to m-th voltage output circuits being configured to output a voltage based on the gradation data to the other end of the first to m-th voltage outputting capacitors, m being an integer of 2 or more.

16. The driver according to claim 15, wherein the computation amplifier is made up of a transistor with a breakdown voltage lower than a breakdown voltage of a transistor making up the first driving circuit.

17. The driver according to claim 16, wherein a distance between a source and a drain of the transistor making up the first driving circuit is greater than a distance between a source and a drain of a transistor making up the second driving circuit, or a film thickness of a gate insulating film of the transistor making up the first driving circuit is greater than a film thickness of a gate insulating film of the transistor making up the second driving circuit.

* * * * *